US012776423B2

(12) United States Patent
Mercier et al.

(10) Patent No.: US 12,776,423 B2
(45) Date of Patent: Oct. 27, 2026

(54) NUCLEAR FUEL ASSEMBLY MANUFACTURING METHOD, NUCLEAR FUEL ASSEMBLY MANUFACTURING PLANT AND METHOD OF EXPANDING SUCH A PLANT

(71) Applicant: FRAMATOME, Courbevoie (FR)

(72) Inventors: Lawrence Mercier, Romans sur Isère (FR); Andreas Falge, Nordhorn (DE); Amaury Fayard, Laeken (BE)

(73) Assignee: FRAMATOME, Courbevoie (FR)

( * ) Notice: Subject to any disclaimer, the term of this patent is extended or adjusted under 35 U.S.C. 154(b) by 487 days.

(21) Appl. No.: 18/220,359

(22) Filed: Jul. 11, 2023

(65) Prior Publication Data

US 2023/0352198 A1 Nov. 2, 2023

Related U.S. Application Data

(62) Division of application No. 17/256,998, filed as application No. PCT/IB2019/055721 on Jul. 4, 2019, now abandoned.

(30) Foreign Application Priority Data

Jul. 5, 2018 (WO) .................. PCT/IB2018/001153

(51) Int. Cl.
*G21C 21/02* (2006.01)
*G21C 3/334* (2006.01)
*G21C 17/06* (2006.01)

(52) U.S. Cl.
CPC ............. *G21C 21/02* (2013.01); *G21C 3/334* (2013.01); *G21C 17/06* (2013.01)

(58) Field of Classification Search
CPC ................................ G21C 21/00; G21C 21/02
See application file for complete search history.

(56) References Cited

U.S. PATENT DOCUMENTS 4,548,347 A 10/1985 Christiansen et al.
4,687,605 A 8/1987 Cellier et al.
(Continued)

FOREIGN PATENT DOCUMENTS

CN 85101317 A 1/1987
CN 85105728 A 1/1987
(Continued)

OTHER PUBLICATIONS

Glancy, J. E. Design information questionnaire for a model mixed oxide fuel fabrication facility. [IAEA form]. No. BNL-21408. Science Applications, Inc., La Jolla, Calif.(USA), 1976. (Year: 1976).*

(Continued)

*Primary Examiner* — Sharon M Davis
(74) *Attorney, Agent, or Firm* — Davidson Kappel LLC

(57) ABSTRACT

A method is for manufacturing a nuclear fuel assembly (2) comprising nuclear fuel rods (4) arranged in a bundle and a skeleton (6) supporting the fuel rods (4). The method comprise the steps of inserting fuel rods (4) into the skeleton (6) to obtain a fuel assembly (2) and packaging the fuel assembly (2) in view of transportation. The steps are being performed in a same nuclear fuel assembly manufacturing plant (20), preferably in a same nuclear fuel assembly manufacturing building (60).

20 Claims, 12 Drawing Sheets

(56) References Cited

U.S. PATENT DOCUMENTS

| | | | | |
|---|---|---|---|---|
| 5,881,119 | A | 3/1999 | Evans et al. | |
| 5,932,930 | A * | 8/1999 | Wadekamper | G21C 3/623 376/419 |
| 6,128,360 | A | 10/2000 | Yoshizawa et al. | |
| 6,362,740 | B1 | 3/2002 | Jung | |
| 6,577,698 | B1 * | 6/2003 | Boonen | G21C 3/334 376/261 |
| 8,537,960 | B2 | 9/2013 | Kwon et al. | |
| 2003/0103593 | A1 * | 6/2003 | Bailey | G21C 21/02 376/268 |
| 2006/0285626 | A1 | 12/2006 | Bailey et al. | |
| 2009/0080590 | A1 | 3/2009 | Smith et al. | |
| 2010/0195783 | A1 | 8/2010 | Kwon et al. | |
| 2014/0251960 | A1 | 9/2014 | Borell et al. | |
| 2017/0159305 | A1 | 6/2017 | Haney | |
| 2017/0350150 | A1 | 12/2017 | Rudlinger | |

FOREIGN PATENT DOCUMENTS

| | | | | |
|---|---|---|---|---|
| CN | 1150397 | A | 5/1997 | |
| CN | 133909 | A | 1/2004 | |
| CN | 207 541 958 | U | 6/2018 | |
| DE | 19960080 | A1 * | 6/2001 | G21C 3/335 |
| EP | 0192137 | A2 | 8/1986 | |
| EP | 0211853 | B1 | 9/1989 | |
| FR | 2291578 | A1 | 6/1976 | |
| GB | 2582804 | A * | 10/2020 | G21C 19/18 |
| JP | 558 34392 | A | 2/1983 | |
| JP | S58034392 | A | 2/1983 | |
| JP | S61193096 | A | 8/1986 | |
| JP | 5834392 | A | 3/1992 | |
| JP | H11190794 | A | 7/1999 | |
| JP | H11508050 | A | 7/1999 | |
| JP | H11242093 | A | 9/1999 | |
| JP | 2000241580 | A | 9/2000 | |
| JP | 2010127937 | A | 6/2010 | |
| JP | 2014529056 | A | 10/2014 | |
| RU | 2155395 | C1 | 8/2000 | |
| RU | 2228550 | C2 | 5/2004 | |
| RU | 2243875 | C2 | 1/2005 | |
| RU | 2010154270 | A | 7/2012 | |
| RU | 2459292 | C1 | 8/2012 | |
| WO | WO2007041160 | A2 | 4/2007 | |
| WO | WO2012146444 | | 11/2012 | |
| WO | WO2014197064 | A2 | 12/2014 | |

OTHER PUBLICATIONS

Tomchnn; Production of Fuel Assembly at the Novosibirsk Chemical Concentrate Plant, 2012 Live Journal, pp. 1-18 (including computer translation).

Sundstrand Energy Systems, Kilowatt Isotope, Power System, Phase II Plan, vol. I, Phase II Program Plan, Apr. 1978.

Production of Nuclear Fuel BB3P, Dec. 13, 2016 (in Russian, with English translation).

Duke Cogema Stone & Webster: Mixed Oxide Fuel Fabrication Facility, Construction Authorization Request, p. 1-651.

"NRC: Fuel Fabrication 11," Nov. 16, 2017 (Nov. 16, 2017), retrieved from the Internet: URL:https://web.archive.org/web/20171116055848/https://www.nrc.gov/materials/fuel-cycle-fac/fuel-fab.html [Feb. 1, 2019].

"MOX Fuel Fabrication : Business—JNFL," Mar. 25, 2018 (Mar. 25, 2018), Retrieved from the Internet: URL:https://web.archive.org/web/20180325232537/https://www.jnfl.eo.jp/en/business/mox/ retrieved on [Feb. 1, 2019].

Allen G Croff: "Reactors and Fuels," Short course at Vanderbilt University, Dec. 16, 2008 (Dec. 16, 2008), XP055550685, Retrieved from the Internet: URL:http://www.cresp.org/NuclearChemCourse/presentations/06_CROFF_Presentation.pdf [retrieved on Feb. 1, 2019].

Kushner, M, P. "Nuclear fuel fabrication for commercial electric power generation." IEEE Transactions on Power Apparatus and Systems (1974): 244-247. (1974).

R.H. Ihde (DCS) to W.F. Kane (NRC), Duke Cogema Stone & Webster Mixed Oxide (MOX) Fuel Fabrication Facility Construction Authorization Request, DCS-NRC-000038, Feb. 28, 2001.

SRS Watch "A Project in Disarray: MOX" U.S> Department of Energy's Mismanaged Plutonium Fuel (MOX) Project, Feb. 28, 2027 http://www.srswatch.org/uploads/2/7/5/8/27584045/mox_in_chaos_report_srs_watch_2.28.2017.pdf.

Romary "The ERU Fuel Manufacturing at AREVA NP" International Atomic Energy Agency, Use of Reprocessed Uranium, IAEA-TECDOC-CD-1630, IAEA, Vienna (2010).

Negro, M. et al. (2018) Studies on Capacity Expansion of Fuel Plants for Nuclear Research Reactors. World of Journal of Nuclear Science and Technology, 8, 38-53.

* cited by examiner

NUCLEAR FUEL ASSEMBLY MANUFACTURING METHOD, NUCLEAR FUEL ASSEMBLY MANUFACTURING PLANT AND METHOD OF EXPANDING SUCH A PLANT

The present disclosure relates to the technical field of manufacturing nuclear fuel assemblies.

BACKGROUND

A nuclear fuel assembly (or "fuel assembly") comprises nuclear fuel rods (or "fuel rods") arranged in a bundle and a skeleton supporting the fuel rods.

Each fuel rod comprises a tubular cladding containing nuclear fuel pellets (e.g. $UO_2$ pellets), the two ends of the tubular cladding being closed by respective end plugs. Generally, a fuel rod spring is inserted in the fuel rod cladding for exerting a compression force on the pellets to avoid movement of the pellets inside the fuel rod. The pellets are for example obtained by compaction of nuclear fuel powder (e.g. $UO_2$ powder).

The skeleton comprises for example a bottom nozzle and an top nozzle spaced along a longitudinal axis, guide thimbles extending along the longitudinal axis between the bottom nozzle and the top nozzle with connecting the bottom nozzle and the top nozzle together, and spacer grids attached to the guide thimbles with being distributed along the guide thimbles. The fuel rods extend through the spacer grids and between the bottom nozzle and the top nozzle. The function of the spacer grids is to support the fuel rods.

Manufacturing fuel assemblies requires producing the nuclear fuel powder, pelletizing the nuclear fuel powder to obtain the nuclear fuel pellets (or "pellets"), producing fuel rods namely by loading the pellets into the cladding tubes and welding plugs at the ends of the cladding tubes, manufacturing the skeleton and inserting the fuel rods into the skeleton.

The thus manufactured fuel assemblies can be packaged for transportation to nuclear power plants.

Today, these operations are performed in a same nuclear fuel assembly manufacturing plant.

Besides, manual production is generally replaced progressively by automation to improve productivity, increase capacity and manage a more continuous flow of operations.

However, it is necessary to provide protections to the buildings and to the equipment to comply with risks such as fire, flooding, seism. Such protections increase when the manufacturing is automatized.

This leads to a nuclear fuel assembly manufacturing plant with a large footprint, the nuclear fuel assembly manufacturing plant being complex to operate and subject to numerous regulations.

Owing to these constrains, it appears difficult to construct new nuclear fuel assembly manufacturing plants, leading to difficulties of procurement for the nuclear power plant operators.

SUMMARY

One of the aims of the present disclosure is to propose a nuclear fuel assembly manufacturing method that allows constructing and operating a nuclear fuel assembly manufacturing plant more easily.

To this end, a method is provided for manufacturing a nuclear fuel assembly comprising nuclear fuel rods arranged in a bundle and a skeleton supporting the fuel rods, the method comprising the steps of inserting fuel rods into the skeleton to obtain a fuel assembly and packaging the fuel assembly in view of transportation, the steps being performed in a same nuclear fuel assembly manufacturing plant, preferably in a same nuclear fuel assembly manufacturing building.

In specific embodiments, the method comprises one or several of the following features:

- a step of receiving fuel rods transported from a nuclear fuel rod manufacturing plant separated by a non-confined area from the nuclear fuel assembly manufacturing plant, wherein these fuel rods are used during the inserting step;
- the fuel rods are received packaged in at least a fuel assembly container, the method comprising using the fuel assembly container for packaging a nuclear fuel assembly obtained by performing the inserting step;
- receiving nuclear fuel pellets transported from a nuclear fuel pellet manufacturing plant separated by a non-confined area from the nuclear fuel assembly manufacturing plant, wherein these pellets are used during a fuel rod manufacturing step;
- the fuel rod manufacturing step comprises placing the pellets on pellet trays, inserting the pellet trays in an outgassing furnace for removing potential hydrogenous contamination from the pellets, loading the pellets from the pellet trays into a cladding tube in a fuel rod loading station, inserting a spring into the cladding tube, filling the cladding tube with helium gas and/or welding plugs at the ends of the cladding tubes for closing the fuel rod;
- the step of welding the plugs of each fuel rod is performed with using a single welding station, with presenting a first end of the cladding tube to the welding station, welding a first plug to the first end, presenting a second end of the cladding tube to the welding station and welding a second plug to the second end;
- a step of cleaning the fuel assembly and/or a step of inspecting the fuel assembly;
- the cleaning step and/or the inspecting step is/are performed with positioning the fuel assembly in a vertical position and/or substantially at ground level;
- the cleaning step is performed by air blowing cleaning and/or high pressure cleaning and/or washing with bubbling water and/or brushing cleaning, for example manual brushing cleaning;
- inspecting step comprises visually inspecting the fuel assembly positioned vertically using at least one elevator for ascending and/or descending an operator along the fuel assembly;

The present disclosure also relates to a plant configured for manufacturing a nuclear fuel assembly comprising nuclear fuel rods arranged in a bundle and a skeleton supporting the fuel rods, the plant comprising a fuel assembly manufacturing unit comprising an inserting station configured for insertion of the fuel rods into the skeleton to obtain the fuel assembly and a packaging station configured for packaging the fuel assembly into a fuel assembly container in view of transportation.

In specific embodiments, the plant comprises one or several of the following features:

- the inserting station and the packaging station are located in a same building, preferably in a same assembling hall, provided with a crane configured for moving the fuel assembly between the inserting station and the packaging station;

- the fuel assembly manufacturing unit comprises a cleaning station configured for cleaning of the fuel assembly and/or a fuel assembly inspection station configured for inspection of the fuel assembly;
- the cleaning station and/or the fuel assembly inspection station is/are configured for cleaning and/or inspecting the fuel assembly in a vertical position and/or substantially at ground level;
- the cleaning station and/or the fuel assembly inspection station comprise(s) a telescopic enclosure movable between a retracted position for loading the fuel assembly into the station and an extended position for enclosing the fuel assembly loaded into the station;
- the cleaning station and/or the fuel assembly inspection station comprise(s) at least one elevator for moving an operator vertically along the nuclear fuel assembly positioned vertically, e.g. for performing a visual inspection;
- a fuel rod manufacturing unit comprising a pellet receiving area configured for receiving nuclear fuel pellets, a pellet inspection area configured for inspection of the pellets, an outgassing station comprising at least one outgassing furnace configured to expel potential hydrogenous contamination of the pellets, a cladding station configured to receive cladding tubes and check the received cladding tubes, a fuel rod loading station configured for loading the pellets into a cladding tube, a welding station configured for welding plugs to the ends of the cladding tube to form a fuel rod and/or at least one fuel rod inspection station configured for inspection of the fuel rod;
- it comprises the welding station and the at least one fuel rod inspection station, the plant further comprising a first conveying system configured for conveying the fuel rods to the at least one fuel rod inspection station (s), a second conveying system for conveying the fuel rods from the last inspection station to the inserting station, the first conveying system extending along a first direction and the second conveying system extending in a second direction making a non-zero angle with the first direction, and a pivoting trolley configured for transferring the fuel rods from the first conveying system to the second conveying system with pivoting the fuel rods;
- it comprises a logistic area configured for shipping the fuel assemblies manufactured in the plant, for receiving skeleton parts to be assembled to obtain the skeletons and/or for receiving fuel rods;
- the fuel assembly manufacturing unit is configured for interconnection with another manufacturing unit to be installed side-by-side with the fuel assembly manufacturing unit;
- the fuel assembly manufacturing unit comprises at least one utility system configured for interconnection with a corresponding utility system of said other manufacturing unit connected with the fuel assembly manufacturing unit;
- the fuel assembly manufacturing unit comprises at least one utility system configured to operate independently from a corresponding utility system of another manufacturing unit connected with the fuel assembly manufacturing unit;
- said other manufacturing unit is another fuel assembly manufacturing unit for increasing manufacturing capacity or a fuel rod manufacturing unit configured for manufacturing fuel rods starting from nuclear fuel pellets.

A method is also provided of expanding a plant for manufacturing a nuclear fuel assembly comprising nuclear fuel rods arranged in a bundle and a skeleton supporting the fuel rods, the plant having a fuel assembly manufacturing unit comprising an inserting station configured for insertion of fuel rods into the skeleton to obtain the fuel assembly and a packaging station configured for packaging the fuel assembly into a fuel assembly container in view of transportation, wherein said method includes a step of building at least one additional manufacturing unit and connecting the additional manufacturing unit to the fuel assembly manufacturing unit.

In specific embodiments, the method may comprise one or several of the following optional features:

- the additional manufacturing unit is a fuel rod manufacturing unit configured for manufacturing nuclear fuel rods starting from nuclear fuel pellets;
- said method includes a step of building a fuel pellet manufacturing unit configured for manufacturing $UO_2$ based nuclear fuel pellets and connecting the fuel pellet manufacturing unit to the fuel rod manufacturing unit;
- said method includes a step of building a fuel powder manufacturing unit configured for converting $UF_6$ into $UO_2$ and connecting the fuel powder manufacturing unit to the fuel pellet manufacturing unit;
- said method includes building an additional manufacturing unit which is another fuel assembly manufacturing unit for increasing manufacturing capacity.
- said method includes a step of building an additional fuel pellet manufacturing unit configured for manufacturing $UO_2$ based nuclear fuel pellets and connecting the additional fuel pellet manufacturing unit to the additional fuel rod manufacturing unit;
- said method includes a step of building an additional fuel powder manufacturing unit configured for converting $UF_6$ into $UO_2$ and connecting the additional fuel powder manufacturing unit to the additional fuel pellet manufacturing unit.

BRIEF SUMMARY OF THE DRAWINGS

The present disclosure and its advantages will be better understood upon reading the following description given solely by way of example and with reference to the appended drawings, in which.

DETAILED DESCRIPTION

According to one aspect, the present disclosure relates to a method for manufacturing a nuclear fuel assembly comprising nuclear fuel rods arranged in a bundle and a skeleton supporting the nuclear fuel rods.

Figure 1:
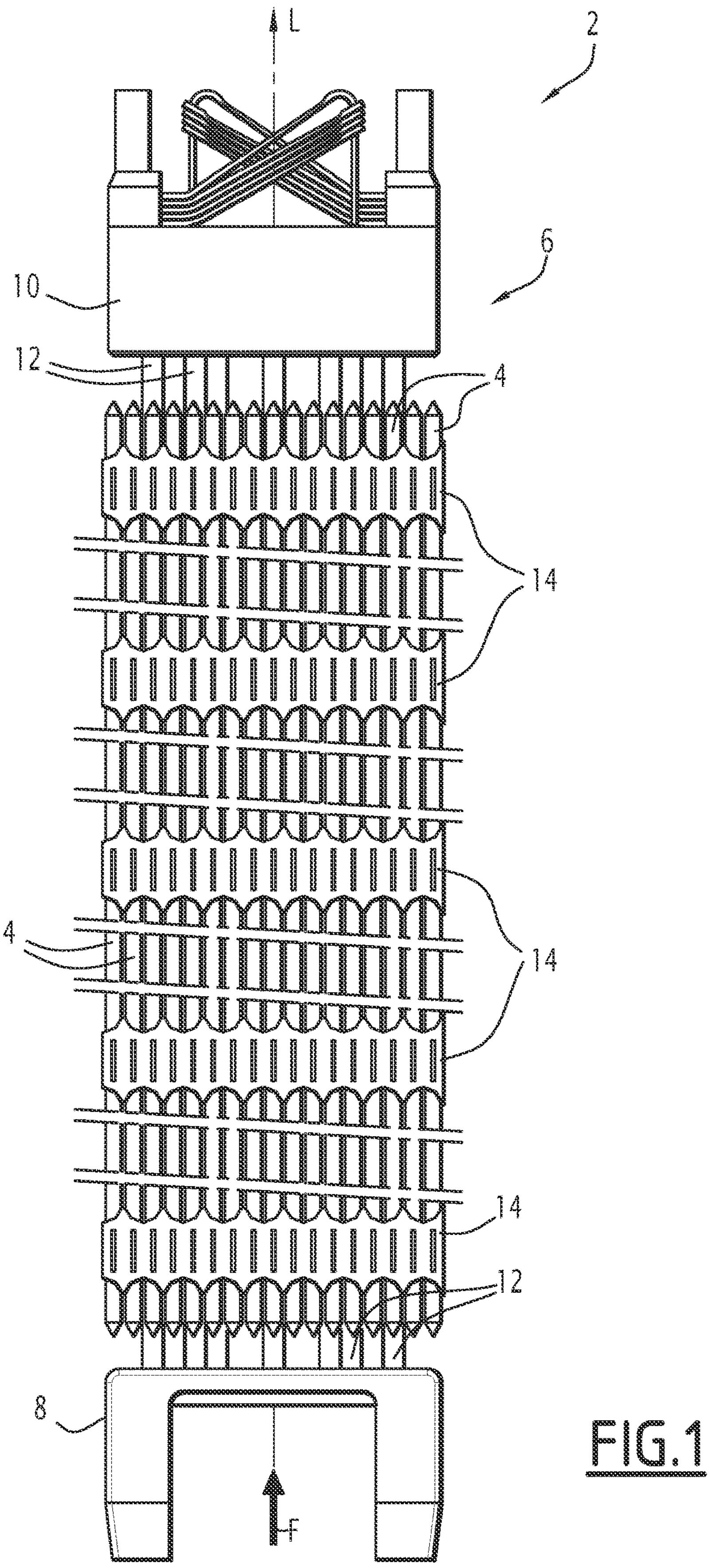
FIG. 1 is a side elevation view of a nuclear fuel assembly.

The nuclear fuel assembly 2 of FIG. 1 comprises a bundle of nuclear fuel rods 4 and a skeleton 6 for supporting the fuel rods 4. The fuel rods 4 extend parallel to each other and to an assembly axis L.

The skeleton 6 comprises a bottom nozzle 8, a top nozzle 10, a plurality of guide thimbles 12 and a plurality of spacer grids 14.

The guide thimbles 12 extend parallel to the assembly axis L and connect the bottom nozzle 8 to the top nozzle 10 with maintaining a predetermined spacing along assembly axis L between the bottom nozzle 8 and the top nozzle 10. The fuel rods 4 are received between the bottom nozzle 8 and the top nozzle 10.

The spacer grids 14 are distributed along the bundle of fuel rods 4. Each spacer grid 14 is fixedly attached to the guide thimbles 12 which extend through the spacer grid 14.

Each spacer grid 14 is configured for supporting the fuel rods 4 in a spaced relationship. Each spacer grid 14 is configured for supporting the fuel rods 4 along the assembly axis L and transversely to the assembly axis L.

The fuel assembly 2 is configured for insertion of rods of a rod cluster control assembly (RCCA) and/or thimble plugs of a thimble plug assembly (TPA) into the guide thimbles 12, the rods or thimble plugs being inserted through the top nozzle 10.

A rod cluster control assembly (RCCA) includes a bundle of parallel control rods and possibly non-absorber rods arranged for insertion in the guide thimbles 12, each control rod including neutron absorbing material. Such an RCCA is provided in a nuclear reactor and is for example vertically movable up and down for increasing or decreasing the reactivity of the fuel assembly 2 or fixedly inserted into a specific fuel assembly 2 for reducing reactivity of the nuclear reactor in the area of this fuel assembly 2, e.g. in a peripheral area of the nuclear reactor.

A thimble plug assembly (TPA) is provided in a nuclear reactor and includes a plurality of plugs each configured for closing a respective guide thimble 12 of a fuel assembly 2 which is not provided with a RCCA in the nuclear reactor, in view of preventing bypass flow of coolant inside the guide thimbles 12 of this fuel assembly 2.

In view of manufacturing a fuel assembly 2, it is possible to provide the skeleton 6 without the bottom nozzle 8 or the top nozzle 10, to insert the fuel rods 4 axially through the spacer grids 14 and to fixedly attach the bottom nozzle 8 or the top nozzle 10 to the guide thimbles 12 to complete the skeleton 6.

The length of a fuel assembly 2 is for example of between 4 m and 6 m and the weight of a fuel assembly 2 is typically of between 700 kg and 900 kg.

The nuclear fuel assembly manufacturing method comprises the steps of inserting fuel rods 4 into the skeleton 6 to obtain a fuel assembly 2 and packaging the fuel assembly 2 in view of transportation, the steps being performed in a same nuclear fuel assembly manufacturing plant, preferably in a same nuclear fuel assembly manufacturing building.

In one particular embodiment, the method comprises a step of receiving fuel rods 4 transported from a nuclear fuel rod manufacturing plant separated by a non-confined area from the nuclear fuel assembly manufacturing plant, wherein these fuel rods 4 are used during the inserting step.

In the present disclosure, "separated by a non-confined area" means that the two plants or buildings are not connected in a confined manner. A transport of skeleton parts or nuclear fuel rods or nuclear fuel pellets or nuclear fuel powder or nuclear fuel powder precursor between the two plants or buildings separated by a non-confined area is performed e.g. via road, sea and/or air.

In this embodiment, the fuel rods 4 are not manufactured in the nuclear fuel assembly manufacturing plant. The fuel rods 4 are manufactured in a nuclear fuel rod manufacturing plant that is distinct from the nuclear fuel assembly manufacturing plant. The fuel rods 4 may be transported from the nuclear fuel rod manufacturing plant to the nuclear fuel assembly manufacturing plant via road, sea and/or air.

In one particular embodiment, the method comprises receiving skeleton parts from a skeleton manufacturing plant separated by a non-confined area from the nuclear fuel assembly manufacturing plant, using these skeleton parts in the insertion step.

In one particular embodiment, the method comprises receiving preassembled skeleton assemblies, each skeleton assembly comprising guide thimbles 12, spacer grids 14 and only one among the top nozzle 10 and the bottom nozzle 8, e.g. one among the top nozzle 10 and the bottom nozzle 8, and, separately, the other one among the top nozzle 10 and the bottom nozzle 8.

The method thus comprises, after the inserting step, a step of assembling the other among the bottom nozzle 8 or the top nozzle 10 to the preassembled skeleton assembly to complete the skeleton 6.

Optionally, the method comprises receiving fuel rods 4 in a container and using this container in the packaging step for packaging a fuel assembly 2.

Indeed, fuel rods 4 and fuel assemblies 2 can be transported in same containers, e.g. the fuel assembly containers of the Framatome company named "FCC".

For example, fuel rods 4 can be placed in a holster having substantially the same external dimensions as a corresponding fuel assembly 2, the holster being placed in the container.

The reuse of the containers allows to limit the transport operations by using the same containers for transporting the fuel rods 4 from the nuclear fuel rod manufacturing plant to the nuclear fuel assembly manufacturing plant and then for transporting the fuel assemblies from the nuclear fuel assembly manufacturing plant to the nuclear power plant.

Alternatively, the method comprises using dedicated first containers for transporting nuclear fuel assemblies 2 and dedicated second containers for transporting fuel rods 4, each second container being e.g. a first container equipped with additional equipment for allowing packaging of fuel rods 4 in the second containers.

Figure 2:
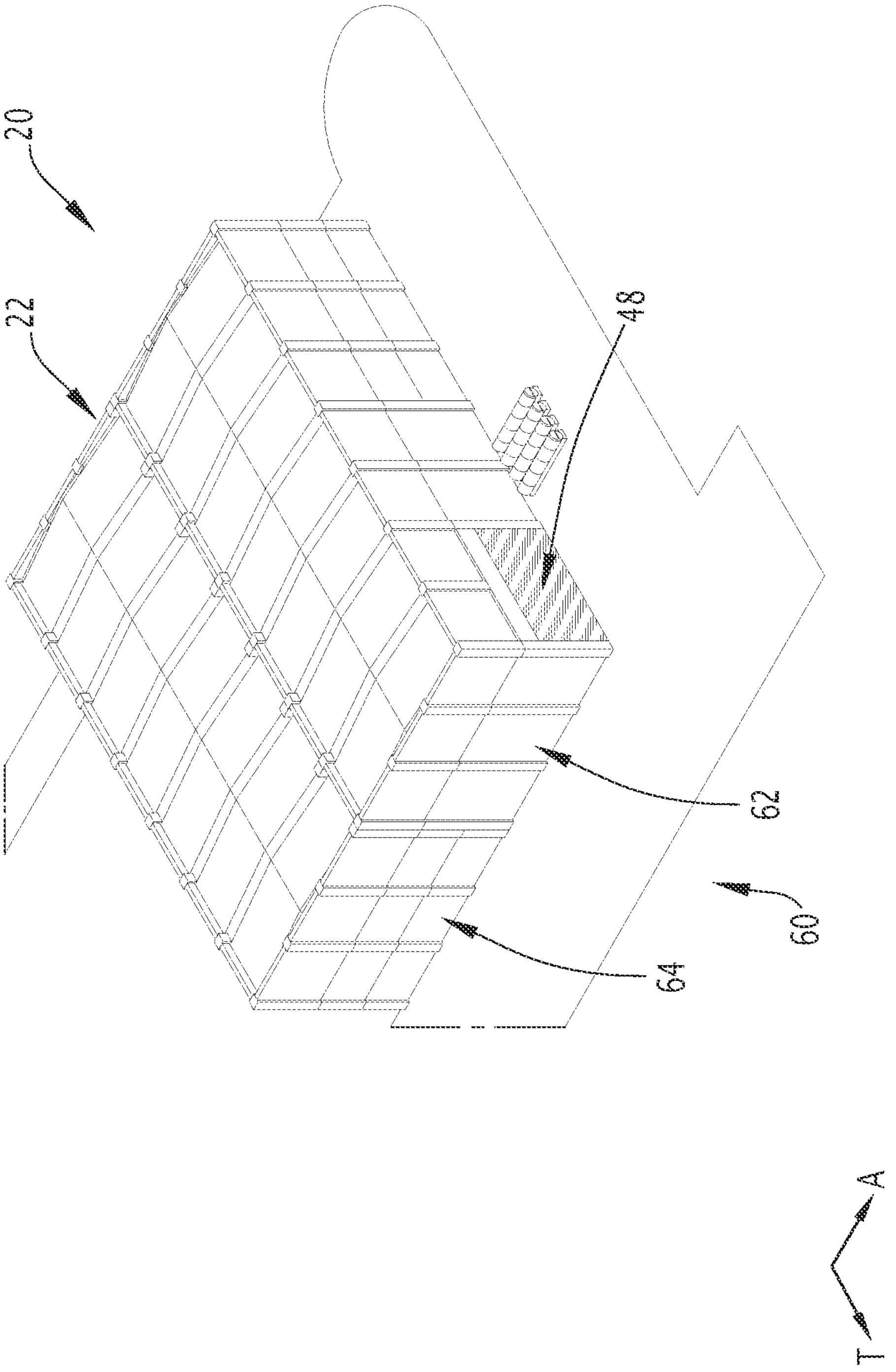
FIGS. 2 and 3 are respectively a perspective view and a top view of a nuclear fuel assembly manufacturing plant.
Figure 3:
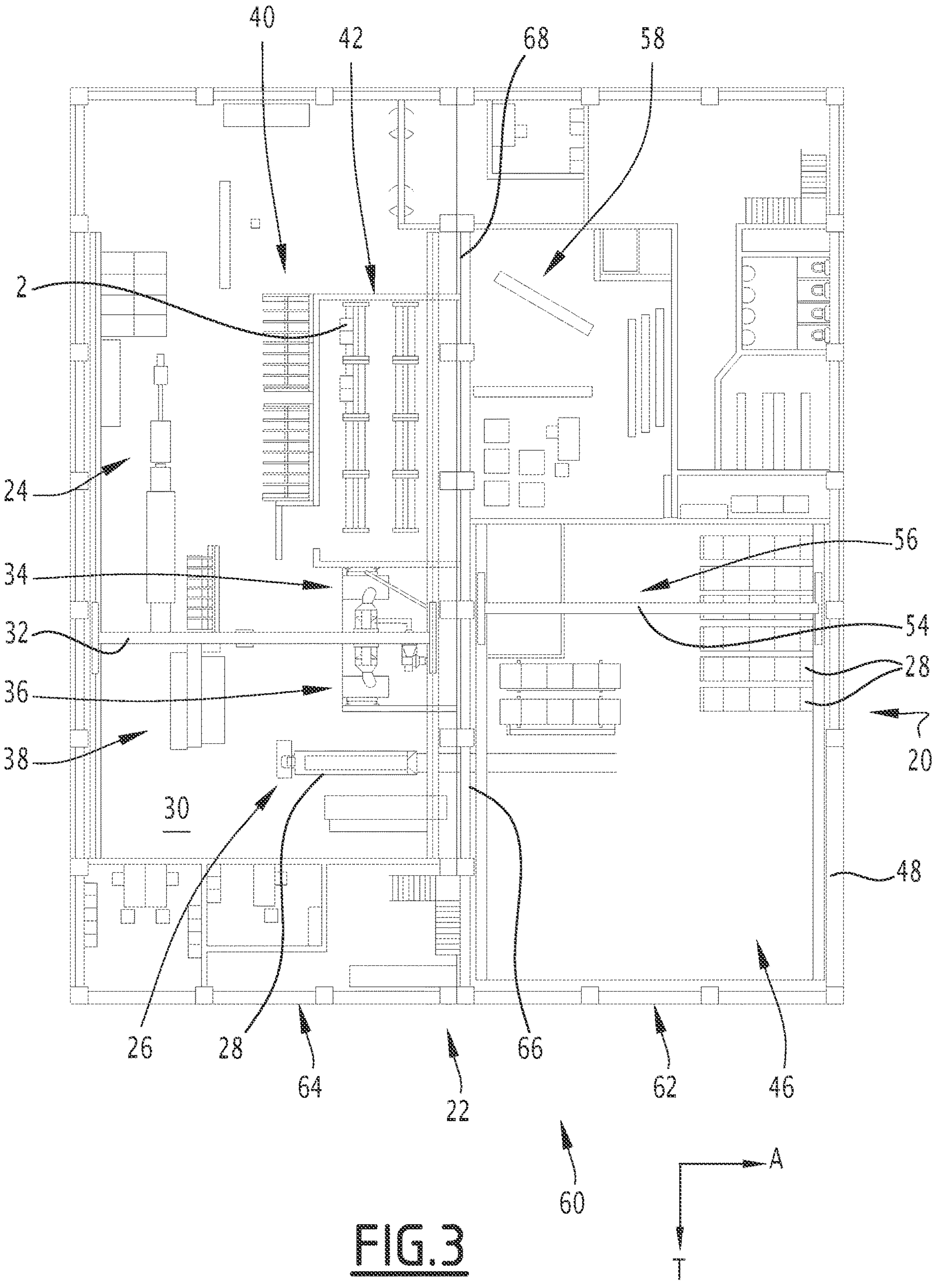

The nuclear fuel assembly manufacturing plant 20 of FIGS. 2 and 3 is configured for the implementation of the method of manufacturing a fuel assembly 2.

The nuclear fuel assembly manufacturing plant 20 comprises a fuel assembly manufacturing unit 22 configured for manufacturing fuel assemblies 2 starting from fuel rods 4 and skeleton parts.

The fuel assembly manufacturing unit 22 comprises an inserting station 24 configured for insertion of fuel rods 4 into the skeleton 6 to obtain a fuel assembly 2 and a packaging station 26 configured for packaging the fuel assembly 2 into a fuel assembly container 28 in view of transportation, e.g. to a nuclear power plant. The fuel assembly container 28 is configured for receiving fuel assemblies 2 and for transporting them via road, air and/or sea.

The nuclear fuel assembly manufacturing plant 20 comprises an assembling hall 30 in which are located namely the inserting station 24 and the packaging station 26. The inserting station 24 and the packaging station 26 are located in the same assembling hall 30.

The fuel assembly manufacturing unit 22 comprises a crane 32 located in the assembling hall 30 for moving the nuclear fuel assemblies 2 between the stations located inside the assembling hall 30.

The crane 32 is notably configured for moving the nuclear fuel assemblies 2 between the inserting station 24 and the packaging station 26. Advantageously, the crane 32 is a bridge crane.

The fuel assembly manufacturing unit 22 optionally comprises a cleaning station 34 configured for cleaning a nuclear fuel assembly 2.

The cleaning station 34 is for example located in the assembling hall 30. Hence, the fuel assembly 2 can be loaded into and/or taken form the cleaning station 34 using the crane 32.

The fuel assembly manufacturing unit 22 optionally comprises a fuel assembly inspection station 36 configured for the inspection of a fuel assembly 2.

The fuel assembly inspection station 36 is for example located in the assembling hall 30. Hence, the fuel assembly 2 can be loaded into and/or taken form the fuel assembly inspection station 36 using the crane 32.

Advantageously, the cleaning station 34 is configured for cleaning of the fuel assembly 2 in a vertical position and/or substantially at ground level and/or the fuel assembly inspection station 36 is configured for inspection of the fuel assembly 2 in a vertical position and/or substantially at ground level.

The vertical position of the fuel assembly 2 for cleaning and/or inspection allows reducing the footprint of the fuel assembly manufacturing unit 22.

Having the fuel assembly 2 at ground level instead of placing the fuel assembly 2 into a pit provided into the ground avoids the provision of such a pit which can be rendered difficult depending on the nature of the ground.

It however requires that the hall in which the cleaning station 34 or the fuel assembly inspection station 36 is located, here the assembling hall 30, has a height which is sufficient for accommodating the fuel assembly 2 vertically.

Optionally, the cleaning station 34 is also configured for performing a rod cluster control assembly test (or "RCCA test") and/or a thimble plug assembly test (or "TPA test") while the fuel assembly 2 is in the cleaning position.

This allows reducing footprint of the fuel assembly manufacturing unit 22 by performing cleaning as well as RCCA test and/or TPA test in a same station instead of providing respective stations for cleaning, RCCA test and TPA test.

A RCCA test is a test of insertion the control rods of a RCCA into the fuel assembly 2 to ensure that, in operation, the RCCA will properly insert into the guide thimbles 12 of the fuel assembly 2. A deformation of the fuel assembly 2 or a foreign body located in a guide thimble 12 may prevent proper insertion of the RCCA. Similarly, a TPA test is a test of insertion the thimble plugs of a TPA into the guide thimbles 12 of the fuel assembly 2.

The fuel assembly inspection station 36 is configured for performing geometrical measurements and/or visual inspection.

Preferably, the fuel assembly inspection station 36 is configured for performing both geometrical measurements and visual inspection. This allows reducing footprint of the fuel assembly manufacturing unit 22 by performing geometrical measurements and visual inspection in a same station instead of providing respective stations for geometrical measurements and visual inspection.

Geometrical measurements may include for example a distance between fuel rods 4, a distance between fuel rods 4 and guide thimbles 12, an external envelope of the fuel assembly 2, a verticality of the fuel assembly 2 . . . .

Geometrical measurements are performed with instruments. The fuel assembly inspection station 36 comprises for example a measurement assembly which is vertically movable along a fuel assembly 2 received in the fuel assembly inspection station 36, the measurement assembly comprising the instruments.

Visual inspection is performed for example for detecting any foreign body that may be present within the bundle of fuel rods 4.

The fuel assembly manufacturing unit 22 optionally comprises a fuel rod inspection station 38 configured for the inspection of fuel rods 4 received from the nuclear fuel rod manufacturing plant. The fuel rod inspection station 38 is for example located in the assembling hall 30.

The fuel assembly manufacturing unit 22 optionally comprises a fuel rod storage 40 configured for the storage of fuel rods 4 received from the nuclear fuel rod manufacturing plant. The fuel rod storage 40 is for example located in the assembling hall 30. The fuel rod storage 40 comprises for example racks for storing the fuel rods 4 horizontally.

The fuel assembly manufacturing unit 22 optionally comprises a fuel assembly storage 42 configured for storing nuclear fuel assemblies 2 before cleaning, inspecting and/or packaging the nuclear fuel assemblies 2.

The fuel assembly storage 42 is for example located in the assembling hall 30. Hence, a nuclear fuel assembly 2 can be loaded into and/or taken from the fuel assembly storage 42 using the crane 32.

The fuel assembly storage 42 is for example a room delimited inside the assembling hall 30.

The fuel assembly storage 42 comprises for examples racks for storing each fuel assembly 2 in a vertical position.

Alternatively or optionally, the nuclear fuel assemblies 2 may be stored into fuel assembly containers 28, preferably after cleaning and/or inspection. The nuclear fuel assemblies 2 stored in the fuel assembly containers 28 are ready to be sent to a nuclear power plant.

The fuel assembly manufacturing unit 22 optionally comprises a logistic area 46 configured for storing, receiving and/or sending transport containers.

The logistic area 46 is accessible from the exterior of the fuel assembly manufacturing unit 22 via a door 48 opening to the exterior. Preferably, the logistic area 46 is accessible to trucks and/or forklifts.

Optionally, the logistic area 46 is provided with a logistic area bridge crane 54 dedicated to the logistic area 46. This logistic area bridge crane 54 is configured for example for lifting transport containers, notably fuel assembly containers 28 as well as fuel rod containers. The logistic area bridge crane 54 may be omitted, in which case handling operations may be performed using for instance a forklift. However, the logistic area bridge crane 54 provides more flexibility.

Preferably, the packaging station 26 is located in the assembling hall 30 with being adjacent to the logistic area

46. Hence, a fuel assembly container 28 receiving a fuel assembly 2 can be moved from the packaging station 26 to the logistic area 46 easily.

In one particular embodiment, the logistic area 46 comprises a container storage zone 56 for storing transport containers. As illustrated on FIG. 1, several fuel assembly containers 28 are present in the container storage zone 56.

The nuclear fuel assembly manufacturing plant 20 optionally comprises a component area 58 which is configured for inspecting and storing skeleton parts.

As illustrated on FIG. 2, the fuel assembly manufacturing unit 22 is housed in a building 60 made of two building modules 62, 64 arranged side-by-side in an alignment direction A. For example, the two building modules 62, 64 are each of rectangular shape and of substantially the same dimensions (length, width and height).

The stations (inserting station 24, packaging station 26 . . . ) and equipment (crane(s), storages . . . ) of the fuel assembly manufacturing unit 22 are located in the two building modules 62, 64.

The logistic area 46 is located in a first building module 62 among the two building modules 62, 64 and the inserting station 24 and the packaging station 26 are located in the second building module 64 among the two building modules 62, 64.

Where the case may be, as in the illustrated in FIG. 3, the component area 58 is for example located in the same building module as the logistic area 46, i.e. here the first building module 62.

Where the case may be, as illustrated in FIG. 3, the cleaning station 34, the fuel assembly inspection station 36, the fuel rod inspection station 38, the fuel rod storage 40 and/or the fuel assembly storage 42 is/are for example located in the same building module as the inserting station 24 and the packaging station 26, i.e. here the second building module 64.

In the illustrated example, the logistic area 46 and the component area 58 located in the first building module 62 each communicate with the second building module 64, and more particularly with the assembling hall 30, via respective passages 66, 68.

The passage 66 between the logistic area 46 and the assembling hall 30 is adjacent the packaging station 26 and/or the passage 68 between the component area 58 and the assembling hall 30 is adjacent the inserting station 24.

For example, the cleaning station 34, the fuel assembly inspection station 36, the fuel rod storage 40 and/or the fuel assembly storage 42 are located in the assembling hall 30 between these two passages 66, 68.

In the illustrated example, the method for manufacturing a nuclear fuel assembly 2 comprises:

- receiving the fuel rods 4, inspecting the fuel rods 4 in the fuel rod inspection station 38 and transferring the inspected fuel rods 4 to the inserting station 24;
- receiving the skeleton parts and inspecting the skeleton parts in the component area 58 and transferring the skeleton parts to the inserting station 24;
- inserting the fuel rods 4 into the skeleton 6 deprived of bottom nozzle 8 and/or top nozzle 10 and attaching the bottom nozzle 8 and/or the top nozzle 10 of the skeleton 6 to complete the skeleton 6, thus obtaining a fuel assembly 2;
- cleaning the fuel assembly 2 in the cleaning station 34 and/or inspecting the fuel assembly 2 in the fuel assembly inspection station 36;
- packaging the fuel assembly 2 into a fuel assembly container 28 in the packaging station 26;
- transferring the fuel assembly container 28 to the logistic area 46 for sending the fuel assembly container 28 to a nuclear power plant.

Insertion of the fuel rods 4 may be performed from top to bottom of the fuel assembly 2, the top nozzle 10 being omitted or removed, or from bottom to top of the fuel assembly 2, the bottom nozzle 8 being omitted or removed. Besides, insertion of the fuel rods 4 may be performed by pushing and/or pulling each fuel rod 4.

In one exemplary embodiment, the insertion station 24 is configured for sequentially inserting groups of fuel rods into the skeleton 6, each group of fuel rods being prepared manually and then inserted automatically into the skeleton 6. The fuel rods of each group are to be inserted at a same elevation of the skeleton 6 lying on an insertion bench of the insertion station 24.

In a specific exemplary embodiment, the insertion step comprises:

- gather fuel rods. The fuel rods may be gathered from a fuel rod inspection bench or from a fuel rod storage by mean of at least one fuel rod transfer trolley;
- move the fuel rod manually to a fuel rod group preparation table by following a sequence displayed by a fuel assembly software executed by a computer in accordance with a fuel rod position map;
- transfer the fuel rod manually to a lift table with spacing the fuel rods manually according to the fuel rod position map;
- check the fuel rods for cleanliness and absence of damages;
- check the fuel rod arrangement according the fuel rod position map;
- check the identification of fuel rods and release them for assembling;
- semi-automatic positioning of the lift table and the fuel rods to the adequate elevation according to the fuel road positioning map;
- automatic insertion of the fuel rods into the skeleton 6 by pulling and/or pushing.

In the case the fuel rods are inserted into the skeleton 6 by pulling, the insertion step may comprise:

- checking that a pulling assembly is at home position and place manually protection caps on tie rods configured for pulling the fuel rods through the skeleton 6;
- insert the tie rods into the skeleton and remove manually the protection caps, and
- during the automatic insertion: activation of a lubrication system, pushing of the fuel rod to a gripping position, gripping of the fuel rods and pulling of the fuels through the skeleton. Pulling speed may be checked manually during insertion of a fuel rod, e.g. the first inserted fuel rod.

Optionally, the insertion step comprises, during insertion, checking that lubricant (e.g. water) is applied on the fuel rod, after insertion, checking the setting of the pulling assembly by measuring a distance between the fuel rod ends and shoulders of the guide thimbles plugs, checking the presence orientation and position of the fuel rods and/or checking visually the spacer grids and the fuel rods end plugs for damages.

These operations are repeated for each group of fuel rods according to the fuel rod position map, until all the necessary fuel rods are inserted into the skeleton 6.

Optionally, the insertion step includes insertion of fuel rods containing a neutron poison. The neutron poison contains for example Gadolinium (Gd). In such case, the fuel rods without neutron poison and the fuel rods with neutron poison are preferably stored in different places. For example, the fuel rods containing neutron poison are stored on a dedicated trolley separated from storage for the fuel rods without neutron poison.

Upon preparing a group of fuel rods to be inserted at a same level in the skeleton 6, the operator is guided by the fuel rod insertion map to place the fuel rods without neutron poison and the fuel rods with neutron poison at the appropriate place on the lift-table.

Hence, the groups of fuel rods with and/or without neutron poison are prepared manually on the lifting table with indication from the fuel rod insertion map displayed by a fuel assembly software executed by a computer.

The nuclear fuel assembly manufacturing method and the corresponding nuclear fuel assembly manufacturing plant 20 allows manufacturing fuel assemblies 2 efficiently and with minimized constrains.

The fuel rods 4 are not manufactured inside the nuclear fuel assembly manufacturing plant 20. The manufacture of the nuclear fuel assembly 2 is operated using fuel rods 4 transported from a nuclear fuel rod manufacturing plant in a non-confined area. Fuel rods 4 can be easily transported by road, air and/or sea.

It is thus possible to produce fuel assemblies 2 simply and efficiently in a specific nuclear fuel assembly manufacturing plant 20 at proximity of one or several nuclear power plant(s).

Operations can be performed manually without the need to resort to automatization of some tasks. It is thus easier to start production of nuclear fuel assemblies and to invest in the nuclear fuel assembly manufacturing plant 20.

In a specific embodiment, the nuclear fuel assembly manufacturing method comprises receiving pellets transported from a nuclear fuel pellet manufacturing plant separated by a non-confined area from the nuclear fuel assembly manufacturing plant 20, using these pellets to manufacture fuel rods 4, and using these fuel rods 4 to manufacture fuel assemblies 2 in the nuclear fuel assembly manufacturing plant 20.

The nuclear fuel assembly manufacturing method comprises for example placing the pellets on pellet trays, optionally inserting the trays in an outgassing furnace for removing potential hydrogenous contamination from the pellets, loading the pellets from the pellet trays into a cladding tube in a fuel rod loading station, inserting a spring into the cladding tube, filling the cladding tube with helium gas and/or welding plugs at the ends of the cladding tubes for closing the fuel rod 4.

Figure 4:
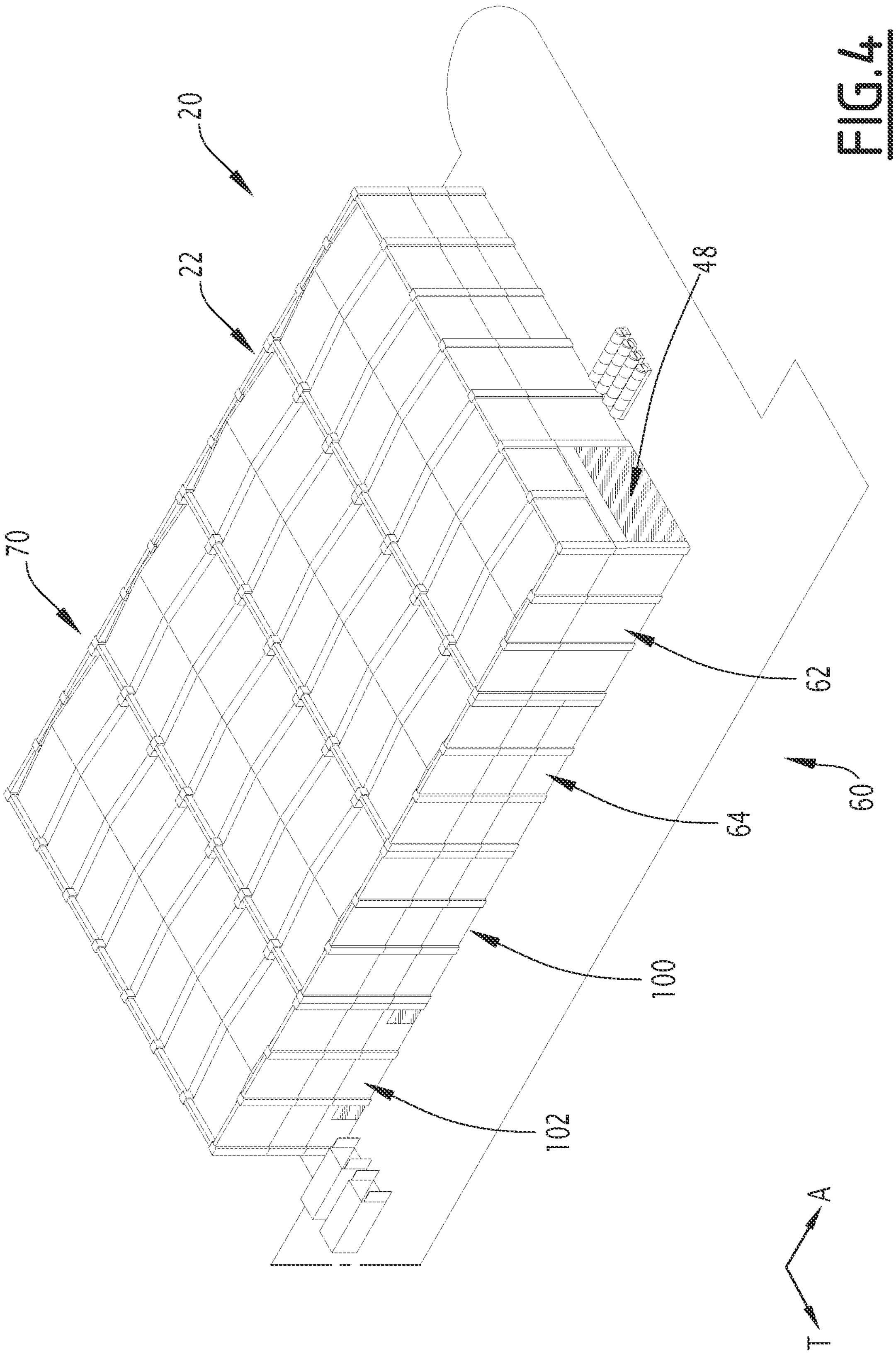
FIGS. 4 and 5 are respectively a perspective view and a top view of a nuclear fuel assembly manufacturing plant.
Figure 5:
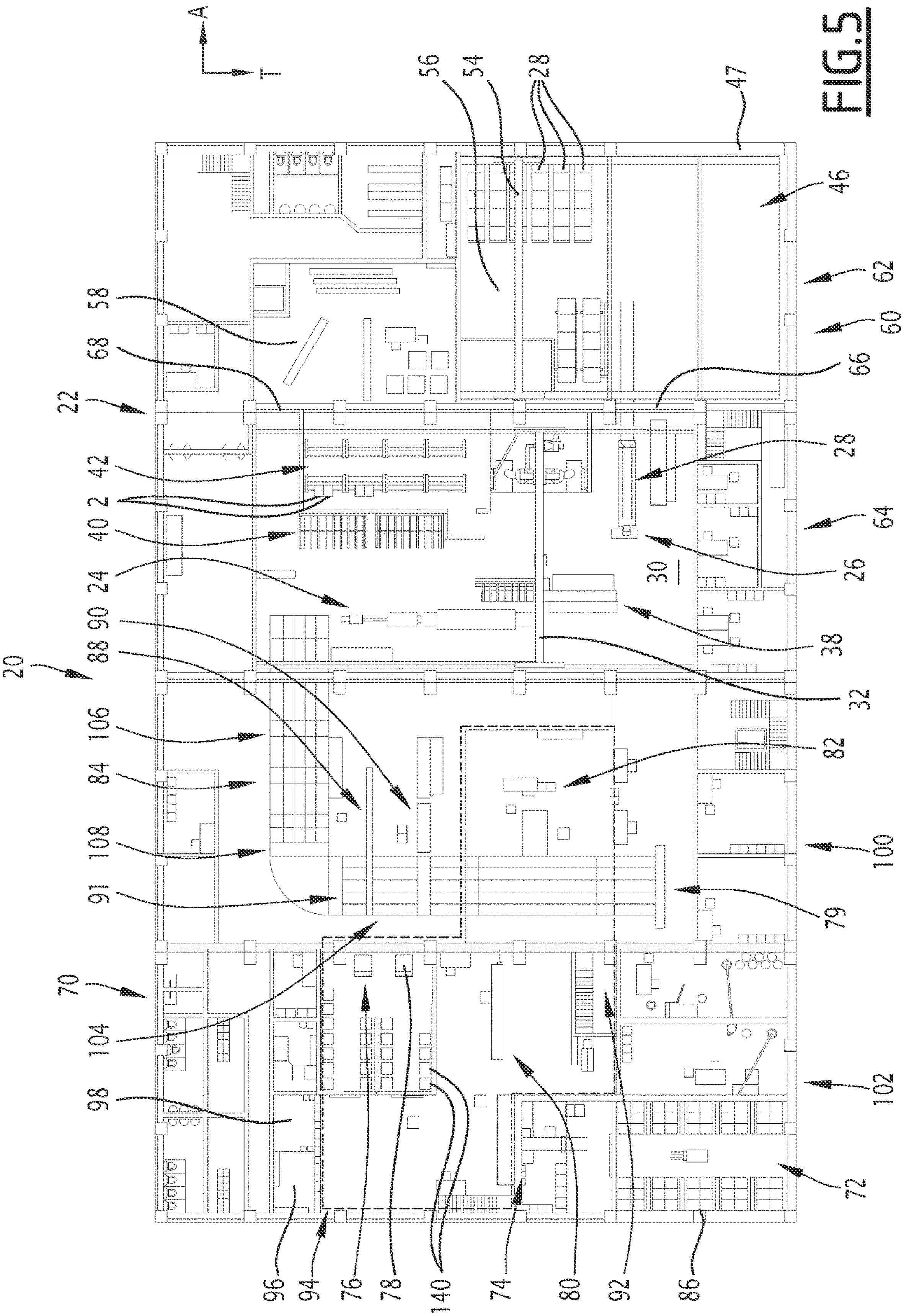

The nuclear fuel assembly manufacturing plant 20 of FIGS. 4 and 5 is configured for implementing such an embodiment of the fuel assembly manufacturing method.

The nuclear fuel assembly manufacturing plant 20 of FIGS. 4 and 5 differs from that of FIGS. 2 and 3 in that it further comprises a fuel rod manufacturing unit 70 configured for receiving pellets transported from a nuclear fuel pellet manufacturing plant separated by a non-confined area from the nuclear fuel assembly manufacturing plant 20 and to manufacture fuel rods 4 using these pellets, the fuel rods 4 being in turn used in the inserting step.

The fuel rod manufacturing unit 70 comprises for example a pellet receiving area 72 configured for receiving pellets, a pellet inspection area 74 configured for inspecting the pellets, an outgassing station 76 comprising at least one outgassing furnace 78 configured to expel potential hydrogenous contamination of the pellets, a cladding station 79 configured to receive cladding tubes and check the received cladding tubes, a fuel rod loading station 80 configured for loading the pellets into a cladding tube, a welding station 82 configured for welding plugs to the ends of the cladding tubes and/or a fuel rod inspection area 84 configured for inspecting the fuel rods 4.

The pellet receiving area 72 is configured for receiving the pellets packed in pellet containers 86 and for temporarily storing the pellets with leaving the pellets in these pellet containers 86.

Each pellet container 86 comprises for example a sealed casing containing several pellet transportation sheets and an outer shell, a structure, the outer shell structure being configured for packing the pellet containers 86 in an intermodal shipping container.

The pellet transportation sheets are metallic corrugated sheets which comprise several parallel ridges and furrows, each furrow being configured for receiving a column of nuclear fuel pellets.

The pellet inspection area 74 is configured for unpacking the pellet transportation sheets from the pellet containers 86, transferring the pellets from a pellet transportation sheet onto a pellet tray and inspecting visually the nuclear pellets.

These operations are for example done manually. Placing the pellets on trays is for example performed by sliding manually all pellet columns from the pellet transportation sheet onto a pellet tray. Inspecting visually the pellets is for example performed by inspecting the visible surface of the pellets located on a pellet tray, then placing upside down a second pellet tray on the top of the pellets, returning both pellet trays together, removing the first pellet tray and finally inspecting the other visible surface of the pellets.

Figures 6, 7, 8, 9:
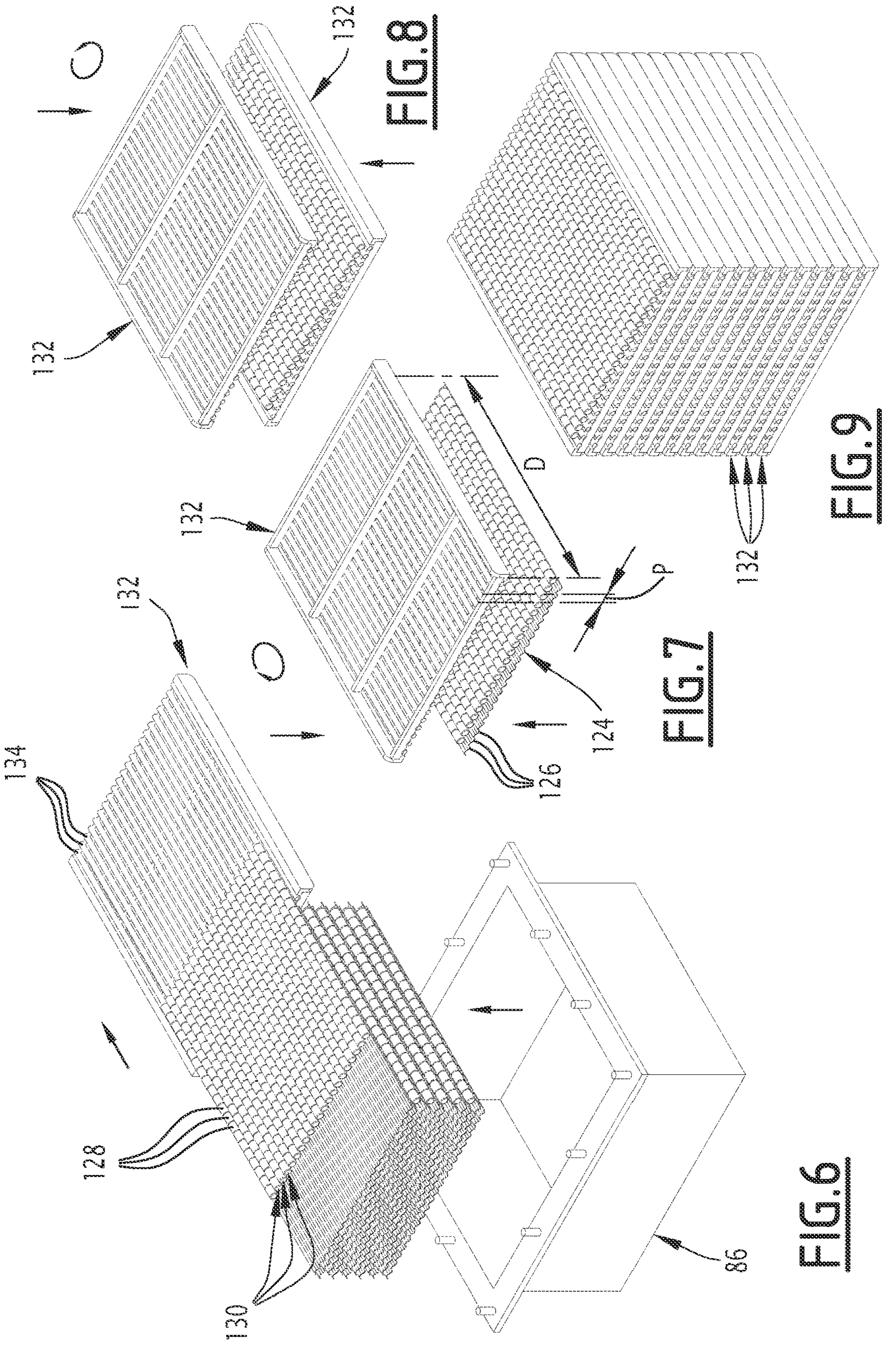
FIG. 6 is a perspective view illustrating pellet transportation sheets and a pellet tray, as well as the transfer of pellets from one of the pellet transportation sheets to the pellet tray.
FIG. 7 is a perspective view illustrating a transfer of pellets from a pellet transportation sheet to a pellet tray.
FIG. 8 is a perspective view illustrating a transfer of pellets from a pellet tray to another pellet tray.
FIG. 9 is a perspective view illustrating a stack of pellet trays.

As illustrated on FIG. 6, each pellet transportation sheet 124 has parallel furrows 126 configured for receiving pellets 128 arranged in pellet columns 130.

Each pellet transportation sheet 124 is for example a metallic corrugated sheet comprising ridges alternating with the furrows 126.

Each pellet tray 132 has for example parallel bars 134 defining between them grooves configured for receiving pellets 128 arranged in pellet columns 130.

In a preferred embodiment, as illustrated on FIG. 6, the pellet transportation sheets 124 and the pellet trays 132 are different but geometrically compatible to allow transfer of pellet columns 130 from a pellet transportation sheet 124 to a pellet tray 132.

More specifically, the pitch P between the furrows 126 of a pellet transportation sheet 124 and the pitch P between the bars 134 of a pellet tray 132 are substantially equal, the pellet transportation sheet 124 and the pellet tray 132 comprise as many furrows 126 as grooves between the bars 134 and the length D of the furrows 126 of the pellet transportation sheet 124 is substantially equal to that of the bars 134 of the pellet tray 132.

In one exemplary embodiment, transferring pellets 128 from a pellet transportation sheet 124 to a pellet tray 132 includes placing the pellet tray 132 side-by-side with the pellet transportation sheet 124 such that each furrows 126 of the pellet transportation sheet 124 is aligned with a respective groove between bars 134 of the pellet tray 132 as illustrated on FIG. 6, and sliding each pellet column 130 of the pellet transportation sheet 124 into a groove of the pellet tray 132.

Alternatively or optionally, as illustrated on FIG. 7, transferring pellets 128 from a pellet transportation sheet 124 to a pellet tray 132 includes placing the pellet tray 132 upside down on the pellet transportation sheet 124 such that each pellet column 130 is received in a respective groove between the bars 134 of the pellet tray 132, and then turning the assembly composed of the pellet transportation sheet 124 and the pellet tray 132 upside down such that the pellet tray 132 is below and the pellet transportation sheet 124 above, and removing the pellet transportation sheet 124.

Such transferring with turning allows a visual inspection of both faces of the pellets 128 since a face is visible when the pellets 128 are on the pellet transportation sheet 124 and the other face of the pellets 128 is then visible the pellets 128 having been transferred to the pellet tray 132 with an upside down tuning.

Alternatively or optionally, as illustrated on FIG. 8, such turning of pellets 128 is performed by using two pellet trays 132. The pellets 128 are for examples transferred from a pellet transportation sheet 124 to a pellet tray as illustrated on FIG. 6 and then turned upside-down between two pellet trays 132 as illustrated on FIG. 8.

Advantageously, as illustrated on FIG. 9, the pellet trays 132 are configured for stacking the pellet trays 132. This eases handling of the pellet trays 132, namely transporting the pellet trays 132 and/or transferring them to outgassing furnaces 79.

The pellet transportation sheets 124 and the pellet trays 132 are for example different in their design (e.g. material and/or structure), the pellet trays 132 being e.g. designed to resist to heating in the outgassing furnace 78.

Advantageously, these pellet trays 132 are configured to be used for storing the pellets 128 and/or placing the pellets 128 into an outgassing furnace 78 and/or loading the pellets 128 into cladding tubes.

The pellets 128 can thus remain on the pellet trays 132 from the inspection to the loading into cladding tubes, without transfer of the pellets 128 from the pellet tray 132 to another support or container between the inspection and the loading. This limits manipulation of the pellets 128 and thus limits the risk of damaging the pellets 128.

Optionally, the fuel rod manufacturing unit 70 comprises movable pellet storage vaults 140, each storage vault 140 being configured for storing pellet trays 132 and movable to allow transferring pellet trays 132.

Figure 10:
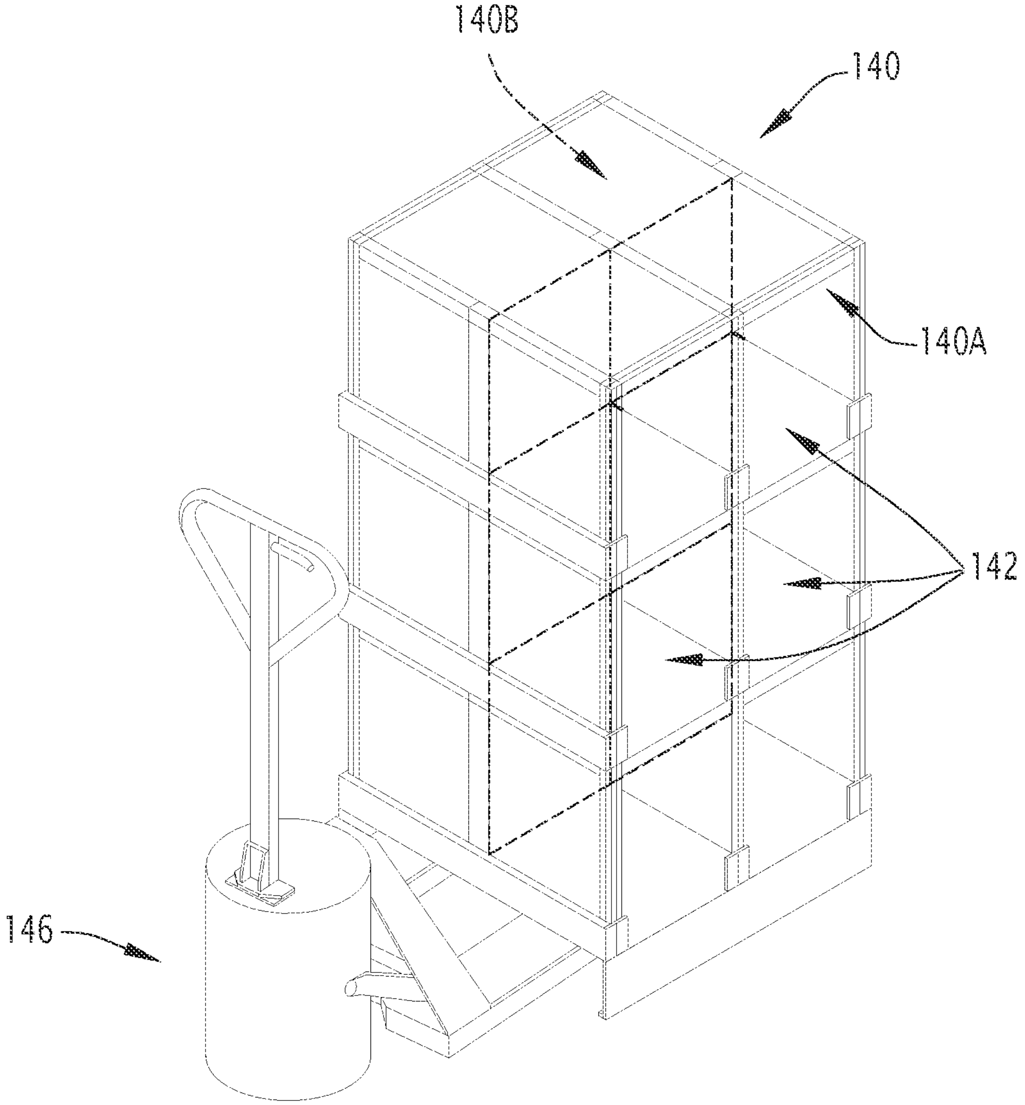
FIG. 10 is a perspective view illustrating a movable vault for storing pellet trays.

As illustrated on FIG. 10, each storage vault 140 is configured for receiving several pellet trays 132, and comprises e.g. several compartments or cells 142, each cell 142 being configured for receiving several pellet trays 132.

Each storage vault 140 comprises for examples several cells 142, each cell 142 being configured for receiving a stack of pellet trays 132 for example equivalent to the stack of pellet transportation sheets 124 from a pellet container 86.

Each cell 142 is preferably provided with a door for closing the cell 142.

Preferably, the cells 142 are distributed on two opposite faces 140A, 140B of the storage vault 140. This allows improving stability of the storage vault 140, increasing storage capacity and also loading two side-by-side outgassing furnaces 78 with pellet tray 132 from both sides of the storage vault 140, without having to turn the storage vault 140. The storage vault 140 is for example positioned between the two outgassing furnaces 78, each outgassing furnace 78 being loading respectively with the pellet trays 132 of one side of the storage vault 140.

Each storage vault 140 exhibits a parallelepiped shape with cells 142 located on two opposite faces 140A, 140B of the storage vault 140.

Each storage vault 140 can be moved and/or elevated easily, e.g. with a standard pallet stacker 146. The pallet stacker 146 allows moving the storage vaults 140 between pellet inspection area 74, storage location, outgassing furnace 78 and fuel rod loading station 80. Elevation eases the manual loading and unloading of pellet trays 132 inside and/or outside the storage vault 140.

Pellet scraps (i.e. pellets with non-compliant surface flaws) may be unintentionally produced during handling of the pellets, namely during inspection, storing, outgassing and/or loading.

Optionally, the method comprises returning pellet scraps to the nuclear fuel pellet manufacturing plant in the pellet containers 86. This allows benefiting from the return of the pellet containers 86 to the nuclear fuel pellet manufacturing plant knowing that the fuel rod manufacturing unit 70 is not configured for manufacturing nuclear fuel pellets and is deprived of equipment for processing pellet scraps.

Optionally, the method comprises temporarily storing pellet scraps in at least one pellet container 86 in the pellet receiving area 72 and/or in at least one cell 142 of a storage vault 140. Pellet scraps may be stored in a can, the can being stored temporarily in a pellet container 86 or storage vault 140. The outgassing station 76 comprises at least one outgassing furnace 78. Each outgassing furnace 78 is configured for expelling potential hydrogenous contamination of the pellets.

Each outgassing furnace 78 is configured for receiving the pellet trays 132 containing the pellets, such that the pellets can be left in the pellet trays 132 for outgassing heating operation, without transfer of the pellets.

As illustrated on FIGS. 4 and 5, the outgassing station 76 is located in a room which is provided with dedicated locations for storing the storage vaults 140.

In one embodiment, the method comprises receiving and inspecting cladding tubes to be filled with nuclear fuel pellets for obtaining the fuel rods 4.

The cladding tubes are for example shipped in wooden boxes and unloaded manually.

The step of inspecting the cladding tubes comprises for example inspecting visually for transport damages (e.g. dents and scratches), checking that the cladding tube is empty and or drying the inside of the cladding tube to avoid presence of moisture.

Emptiness is checked e.g. using an optical emptiness checking device configured for projecting a light beam inside the cladding from one end and capturing light at the other end to check for any object obstructing propagation of the light.

Drying is performed e.g. by a drying device, blowing hot air inside the cladding tube.

As illustrated on FIG. 5, the fuel rod manufacturing unit 70 comprises a cladding station 79.

The cladding station 79 is configured for receiving the cladding tubes and performing the inspection of the received cladding tubes, and namely comprises for example an emptiness checking device and a drying device.

The welding station 82 and the fuel rod loading station 80 are configured to perform all the manufacturing steps of a fuel rod 4.

The manufacturing of a fuel rod 4 comprises for example the following steps:

- weighing the cladding tube with a weighing device of the welding station 82;
- welding a plug at a first end of the cladding tube with a welding machine of the welding station 82, thus obtaining a pre-plugged cladding tube;
- inspecting the first end plug weld;
- loading pellets into the pre-plugged cladding tube and checking the pellet plenum length with the fuel rod loading station 80;

turning the pre-plugged cladding tube such as to present the second end of the cladding tube to the welding device, by mean for example of an inversion trolley available in the welding station 82;

weighing the cladding tube with the weighing device of the welding station 82 such as to determine the uranium content of the fuel rod 4;

inserting a spring at the second end of the cladding tube;

filling the cladding tube with helium gas and welding a plug at the second end of the cladding tube with the welding machine of welding station 82, thus obtaining the fuel rod 4;

inspecting the second end plug weld;

checking the absence of contamination on the fuel rod surface; and releasing the fuel rod 4 to the fuel rod inspection area 84.

Such loading including a turning step allows performing the loading with one single welding machine.

This allows minimizing the footprint of the welding station 82 and minimizing the cost of the fuel rod manufacturing unit 70 by avoiding the provision of two distinct welding machines. Turning the nuclear fuel rod 4 between welding of the plugs is time consuming but this is acceptable in the context of the rate of production foreseen for the fuel rod manufacturing unit 70.

In addition, only one weighing device is needed. Weighing each cladding tube before and after filling with pellets allows to determine the uranium content.

Hence advantageously, the welding station 82 comprises one single welding machine and/or one single weighing device.

The loading of fuel rods 4 can advantageously be performed batchwise.

In such case, the empty weighing, plug welding, and pellet filling steps are operated for a batch of cladding tubes, theses cladding tubes are turned, and then the following steps of filled weighing, spring inserting, plug welding and releasing are performed for the batch of cladding tubes. Each batch of fuel rods 4 comprises for example approximately hundred fuel rods 4.

The fuel rod loading station 80 is advantageously configured for creating pellet columns 130 and loading each pellet column 130 into a cladding tube. Preferably, the fuel rod loading station 80 is configured for creating a pellet column 130 at the specified length for loading into a next cladding tube while a previously created pellet column 130 is being loaded into a preceding cladding tube.

The method preferably comprises a step of inspecting the fuel rods 4, i.e. once the fuel rods 4 are released from the welding station 82.

The step of inspecting the fuel rods 4 may comprise scanning each fuel rod 4 for inspecting the fuel rod 4 in a nondestructive manner, testing helium leak of the fuel rod 4 and performing a final inspection including e.g. measuring the length of the fuel rod 4, checking straightness of the fuel rod 4 and/or checking the fuel rod visual appearance.

Accordingly, the fuel rod inspection area 84 comprises one or several fuel rod inspection station(s).

A fuel rod inspection station is for example a leak testing station 88, in particular a helium leak testing station. Such a leak testing station 88 is configured for identifying possible leaks of the fuel rod 4, namely leaks of the fuel rod cladding, of the plugs and/or between the fuel rod cladding and one of the plugs.

Another fuel rod inspection station is for example a scanning station 90 configured for inspecting the fuel rods 4 in a nondestructive manner. The scanning station 90 is for example configured for passively scanning the gamma radiation emission count of the nuclear fuel pellets contained within the fuel rod 4 to check the enrichment level(s) and uniformity throughout the fuel rod 4. Additionally, the scanning station 90 is for example configured for performing a gamma densitometer test to check the pellet column and plenum lengths, the presence of the required components such as the fuel rod spring and the absence of gaps between the pellets.

Another fuel rod inspection station is for example a final inspection station 91 configured for checking of geometrical characteristics of the fuel rod 4, in particular measuring length of the fuel rod 4, checking straightness of the fuel rod 4 and/or checking visual appearance of the fuel rod 4. The final inspection station 91 comprises for example an inspection bench having a planar workplan.

The fuel rod manufacturing unit 70 optionally comprises a nuclear fuel rod rework station 92 configured for reworking a nuclear fuel rod 4 which has been identified as faulty during nuclear fuel rod inspection in the fuel rod inspection area 84 or during the fuel rod manufacturing in the welding station 82.

The fuel rod manufacturing unit 70 comprises a controlled atmosphere enclosure 94 in which the atmosphere is controlled to ensure personnel safety and avoid the exit of particles of nuclear fuel that may arise from the pellets. The contour of the controlled atmosphere enclosure 94 is show in dotted lines of FIG. 5.

The controlled atmosphere enclosure 94 extends to the stations where the pellets are not sealed into the fuel rods 4.

In particular, in the present example, the pellet inspection area 74, the outgassing station 76, the fuel rod loading station 80 and the welding station 82 are located in the controlled atmosphere enclosure 94.

The controlled atmosphere enclosure 94 is separated from the remaining of the fuel rod manufacturing unit 70, namely from the pellet receiving area 72, from the fuel rod inspection area 84 and from the cladding station 79, including the emptiness checking device and the drying device.

The controlled atmosphere enclosure 94 is accessible to operators via a controlled entrance 96 and a controlled exit 98.

As illustrated on FIG. 4, the fuel rod manufacturing unit 70 is connected to the fuel assembly manufacturing unit 22 in a confined manner.

In the present disclosure two units or buildings or building modules are said to be connected "in a confined manner" when material can be transferred from one unit to the other of from one building to the other or from one building module to the other without transiting via the exterior.

The fuel rod manufacturing unit 70 and the fuel assembly manufacturing unit 22 are here placed side-by-side in a same building.

As illustrated on FIG. 5, the building 60 includes four building modules including the first building module 62 and the second building module 64 housing the fuel assembly manufacturing unit 22 and a third building module 100 and a fourth building module 102 housing the fuel rod manufacturing unit 70.

The welding station 82 and the fuel rod inspection area 84 are located in the third building module 100 which is side-by-side with the second building module 64. The fuel rods 4 produced in the fuel rod manufacturing unit 70 can thus be transferred directly from the fuel rod inspection area 84 to the inserting station 24.

The pellet receiving area 72, the pellet inspection area 74 and the fuel rod loading station 80 are located in the fourth building module 102.

In the present example, the outgassing station 76 and/or the rework station 92 are located in the fourth building module 102.

The controlled atmosphere enclosure 94 extends in the fourth building module 102 and also to the third building module 100 such as to contain the welding station 82. The third and fourth building modules 100, 102 are here provided with internal walls for delimiting the controlled atmosphere enclosure 94 inside the third and fourth building modules 100, 102.

Advantageously, in a general manner, the nuclear fuel assembly manufacturing plant 20 comprises building modules arranged side-by-side with being aligned in the alignment direction A, the buildings modules housing several manufacturing units configured for implementation of respective steps of manufacturing a nuclear fuel assembly 2 (fuel rod manufacturing unit 70, fuel assembly manufacturing unit 22, etc.), each manufacturing unit being housed in one or several of the building modules dedicated to this manufacturing unit.

Manufacturing units of the nuclear fuel assembly manufacturing plant 20 may comprises a fuel assembly manufacturing unit 22 and/or a fuel rod manufacturing unit 70, and also a fuel pellet manufacturing unit configured for manufacturing pellets from nuclear fuel powder and/or a fuel powder manufacturing unit configured for converting a nuclear fuel precursor into nuclear fuel powder, e.g. for converting gaseous $UF_6$ into $UO_2$ powder.

Figure 11:
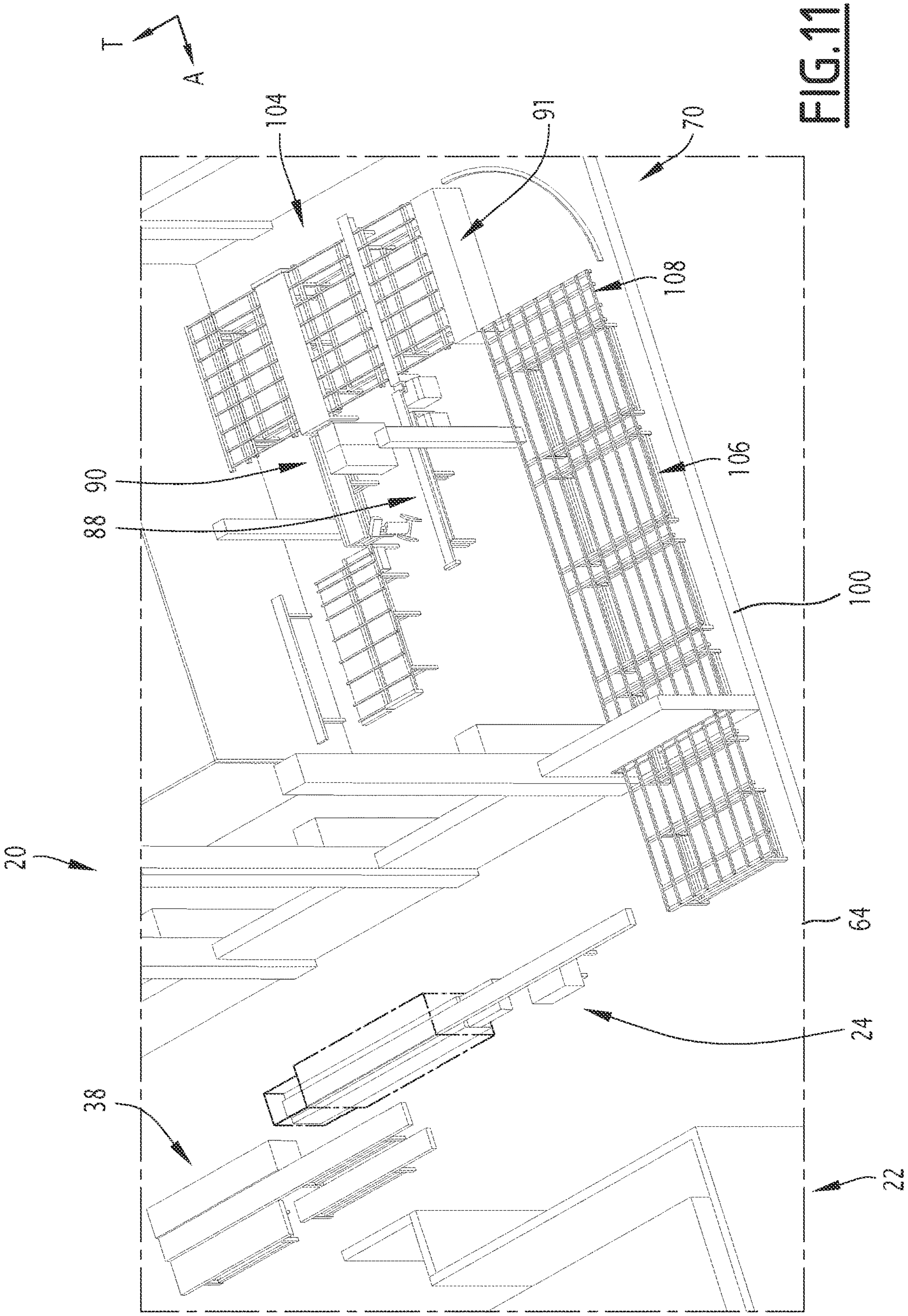
FIG. 11 is a partial perspective view of the nuclear fuel assembly manufacturing plant of FIGS. 4 and 5.

As visible on FIGS. 5 and 11, the fuel rod manufacturing unit 70 comprises conveyors for conveying the fuel rods 4 between the cladding station 79, the welding station 82, the fuel rod inspection area 84 and the inserting station 24.

In the example, the fuel rod manufacturing unit 70 comprises a first conveying system 104 for conveying fuel rods 4 in a first direction and a second conveying system 106 for conveying fuel rods 4 in a second direction making a non-zero angle with the first direction. The second direction is here perpendicular to the first direction.

The fuel rod manufacturing unit 70 comprises a pivoting trolley 108 for transferring the fuel rods 4 from the first conveying system 104 to the second conveying system 106. Preferably, the trolley is manually operated.

This arrangement allows conveying the fuel rods 4 easily without excessive automatization and with a low footprint of the fuel rod manufacturing unit 70 and the nuclear fuel assembly manufacturing plant 20 as a whole.

The second conveying system 106 is configured for transferring fuel rods 4 from the fuel rod inspection area 84 to the insertion station 24. Besides, the second conveying system 106 may be used as buffer storage for storing fuel rods 4 temporarily between the fuel rod inspection area 84 and the inserting station 24. Such storage avoids any supplementary manual operation.

In the illustrated embodiment, the first conveying system 104 is configured for conveying cladding tube from the cladding station 79 to the welding station 82 and for transferring fuel rods 4 from the welding station 82 successively to the fuel rod inspection stations 90, 88, 91 of the fuel rod inspection area 84, and the second conveying system 106 is configured for conveying the fuel rods 4 from the pivoting trolley 108 to the inserting station 24. Fuel rods 4 can be transferred manually from the last fuel rod inspection station (here final inspection station 91) to the pivoting trolley 108.

Each conveying system 104, 106 comprise for example one or several transfer table(s), each transfer table comprising a slightly inclined ramp, whereby each cladding tube or fuel rod 4 can roll along the transfer table by gravity.

For example, one transfer table is provided between each pair of successive stations for transferring the cladding tube or fuel rod 4 from each station to the next one.

The first direction is parallel to the transverse direction T and the second direction is parallel to the alignment direction A such that the nuclear fuel rod 4 are conveyed towards the fuel assembly manufacturing unit 22, more particularly towards the inserting station 24.

In the illustrated example, at least one fuel rod inspection station is located beside the first conveying system 104 and/or a fuel rod inspection station is located at the end of the first conveying system 104. For example, the final inspection station 91 is located at the end of the first conveying system 104 and the other fuel rod inspection station(s) is(are) located successively beside the first conveying system 104.

Preferably, each fuel rod inspection station located beside the first conveying system 104 has its own specific conveying system for transferring a fuel rod 4 from the first conveying system 104 to the fuel rod inspection station and returning the inspected fuel rod 4 to the first conveying system 104.

The placement of at least one fuel rod inspection station beside the first conveying system 104 has been chosen to optimize the footprint with still allowing good working conditions for the production and maintenance operators.

In the present case, the fuel rod inspection stations 88, 90 are located beside the first conveying system 104 and distributed along the first conveying system 104 such that each fuel rod 4 is conveyed in register with the fuel rod inspection station 90, 88, inserted into the fuel rod inspection station 90, 88 and transferred back the first conveying system 104 for being conveyed in register with the next fuel rod inspection station 90, 88 or to the final inspection station 91 located at the end of the first conveying system 104.

As indicated above, the nuclear fuel assembly manufacturing method comprises a step of cleaning a nuclear fuel assembly 2 and/or a step of inspecting a nuclear fuel assembly 2.

The cleaning step and/or the inspecting step is/are performed with positioning the fuel assembly 2 in a vertical position and/or substantially at ground level.

The cleaning step is for example performed by air blowing cleaning and/or high pressure cleaning and/or washing with bubbling water and/or brushing cleaning, for example manual brushing cleaning.

The cleaning step and/or the inspecting step comprise(s) visually inspecting the fuel assembly 2 positioned vertically using at least one elevator for ascending and/or descending along the fuel assembly 2.

Figure 12:
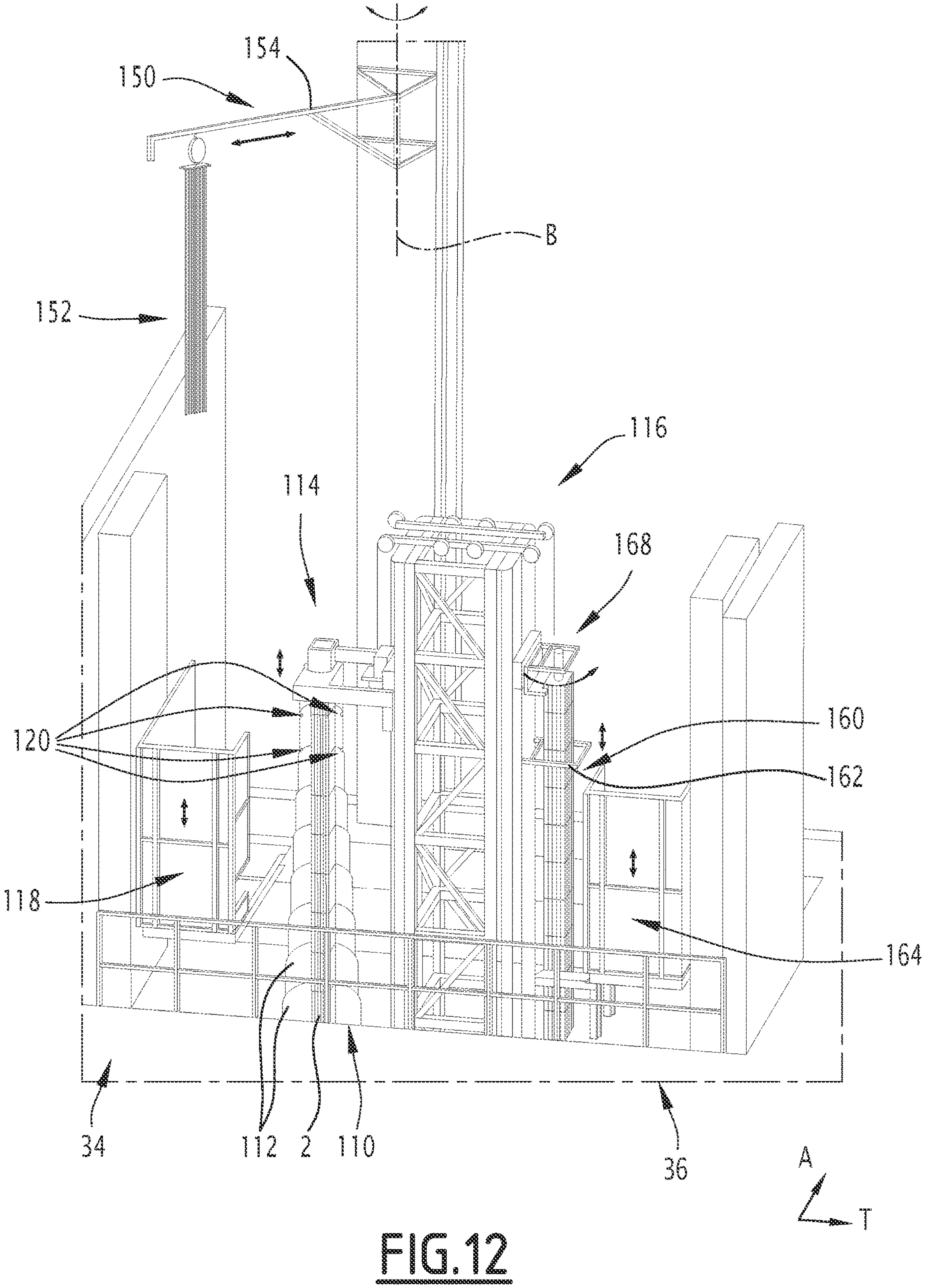
FIG. 12 is a perspective view of a cleaning station and an inspection station.

As illustrated on FIG. 12, a cleaning station 34 is configured for blowing with compressed air.

The cleaning station 34 comprises a telescopic enclosure 110 configured for receiving the fuel assembly 2 vertically.

The telescopic enclosure 110 comprises tubular segments 112 mounted telescopically one onto the others in a vertical direction such as to be movable between a retracted configuration and extended configuration in which the telescopic enclosure 110 defines a tube for receiving the fuel assembly 2. The telescopic enclosure 110 is retracted and extended vertically. In the retracted position, the tubular segments 112 are for example retracted downwardly. Alternatively, they are retracted upwardly.

Retracting the telescopic enclosure 110 allows placing the fuel assembly 2 into the telescopic enclosure 110 without the need to lift the fuel assembly 2 at a high height. Extending the telescopic enclosure 110 allows enclosing the fuel assembly 2 for the blowing cleaning, with avoiding spreading of chips (generated during insertion of fuel rods 4 into the skeleton 6) blown out of the fuel assembly 2 during blowing cleaning.

In view of deploying the telescopic enclosure 110, the cleaning station 34 comprises for example a slide 114 vertically movable along a tower 116, the slide 114 being connected to a tubular segment 112 of the telescopic enclosure 110 and to the blowing nozzle(s).

The cleaning station 34 comprises for example blowing nozzles 120 for blowing air through the fuel assembly 2.

Advantageously, the blowing nozzles 120 are attached to a tubular segment 112 of the telescopic enclosure 110, such that the blowing nozzles 120 are moved along the fuel assembly 2 upon closing the telescopic enclosure 110. Hence, closure of the telescopic enclosure 110 and blowing cleaning can be performed simultaneously.

Advantageously, the cleaning station 34 is configured for performing insertion tests with a rod cluster control assembly (RCCA) and a thimble plug assembly (TPA).

In this view, as illustrated on FIG. 12, the cleaning station 34 comprises a lifting tool 150 to which is suspended a dummy core component 152, i.e. a RCCA or a TPA.

The lifting tool 150 comprises here a pivoting arm 154 which can pivot about a vertical pivoting axis B and a hoist which can slide along the pivoting arm 154 in view of placing the RCCA or TPA above the fuel assembly 2 received in the cleaning station 34 and lowering the RCCA or TPA into the fuel assembly 2 or moving the RCCA or TPA away. The RCCA or TPA can be moved up and down for example using a hoist for suspending the RCCA or TPA to the pivoting arm 154.

As illustrated on FIG. 12, optionally, the cleaning station 34 comprises an elevator 118 for moving an operator vertically along the fuel assembly 2 placed in the cleaning station 34. This allows the operator to secure the top nozzle 10 before releasing the bridge crane 32, to perform the RCCA & TPA tests, to supervise the cleaning operation and/or to perform a global visual inspection of the fuel assembly 2. Such visual inspection would not be possible with a fixed enclosure instead of a telescopic enclosure 110.

As visible on FIG. 12, the fuel assembly inspection station 36 is configured for receiving the nuclear fuel assembly 2 vertically.

The fuel assembly inspection station 36 is configured for performing geometrical measurements on the fuel assembly 2 which is received in the fuel assembly inspection station 36. Geometrical measurements may include length of the fuel assembly 2, verticality of the fuel assembly 2, distances between fuel rods 4, distances between fuel rods 4 and guide thimbles 12, twisting of spacer grids 14 and top nozzle 10 about the assembly axis L.

As illustrated on FIG. 12, the fuel assembly inspection station 36 comprises a measuring assembly 160 comprising instruments configured for performing the geometrical measurements, the measuring assembly 160 being movable vertically along the fuel assembly 2 received in the fuel assembly inspection station 36, such as to performed the measurements all along the fuel assembly 2.

The measuring assembly 160 comprises for example a support frame 162 of annular shape which in use is fitted around the fuel assembly 2 and move along the fuel assembly 2, the support frame 162 supporting instruments distributed on the circumference of the support frame 162.

The instruments may comprise external probes to contact external surfaces of the fuel assembly 2 and measure external geometric parameters (external envelope, twisting, verticality . . . ) and/or internal probes configured for insertion between the fuel rods 4 to measure internal geometric parameters (distances between fuel rods 4, distances between fuel rods 4 and guide thimbles 12 . . . ).

The fuel assembly inspection station 36 comprises an elevator 164 for moving an operator vertically along the fuel assembly 2 placed in the fuel assembly inspection station 36. This allows the operator to perform a detailed visual inspection.

Optionally, the inspection station 36 is configured such that the fuel assembly 2 received in the inspection station 36 is rotatable around its vertical axis.

To this end, the inspection station 36 is for example equipped with a rotary support 168 which permit the operator to turn manually the fuel assembly 2 around its vertical axis L. This allows the operator to inspect visually each one of the four side faces of the fuel assembly 2.

The support frame 162 is configured to allow rotation of the fuel assembly around its longitudinal axis L.

The rotary support 168 is configured to be blocked in a defined angular position during the geometrical measurements performed with the instruments supported by the support frame 162.

In one embodiment, such a rotary feature is not implemented on the cleaning station 34. The elevator 118 at the cleaning station 34 allows the operator to make a workmanship review of the fuel assembly 2 but not a detailed visual inspection on the four side faces of the fuel assembly as in the inspection station 36. The elevator 118 of the station 34 is provided primarily for enabling the operator to secure the top nozzle before releasing the crane 32 and to perform the RCCA & TPA tests. According to another aspect, the present disclosure relates to a method of expanding a plant for manufacturing a nuclear fuel assembly 2 comprising fuel rods 4 arranged in a bundle and a skeleton 6 supporting the fuel rods 4, the plant having a fuel assembly manufacturing unit 22 comprising a nuclear fuel rod inserting station 24 configured for insertion of fuel rods 4 into the skeleton 6 to obtain a fuel assembly 2 and a packaging station 26 configured for packaging the fuel assembly 2 into a fuel assembly container 28 in view of transportation, wherein said method includes a step of building at least one additional manufacturing unit and connecting the additional manufacturing unit to the fuel assembly manufacturing unit 22.

The fuel assembly manufacturing unit 22 and the additional manufacturing unit are built sequentially. The fuel assembly manufacturing unit 22 is build and operated for a while (e.g. several months or several years) and then the additional manufacturing unit is build.

In the present disclosure, "connecting" manufacturing units means that the manufacturing units are connected such as to delimit together a confined area for the manufacture of nuclear fuel assemblies. The flow of material between the manufacturing units is operated in a continuous confined area, in particular without passing via the exterior to the open air.

According to one aspect, the method comprises adding an additional manufacturing unit configured for manufacturing components to be used in existing manufacturing unit(s) of the plant, in particular components to be used in the fuel assembly manufacturing unit 22. These components have to be manufactured before performing the process steps performed in the already existing manufacturing units, in particular in the fuel assembly manufacturing unit 22.

Hence, the plant is expanded in the upstream way when considering the process of manufacturing a nuclear fuel assembly 2.

In a particular embodiment, an additional manufacturing unit is a fuel rod manufacturing unit 70 configured for manufacturing fuel rods 4 starting from pellets. These fuel rods 4 can thus be used in an inserting step performed in the inserting station 24 of the fuel assembly manufacturing unit 22.

Further additional manufacturing units may be contemplated.

In one embodiment, the method includes a step of adding a fuel pellet manufacturing unit configured for manufacturing $UO_2$ based nuclear fuel pellets and connecting the fuel pellet manufacturing unit to the fuel rod manufacturing unit 70.

The method may also include a step of adding a fuel powder manufacturing unit configured for converting a nuclear fuel precursor into nuclear fuel powder, e.g. gaseous $UF_6$ into $UO_2$ powder, and connecting the fuel powder manufacturing unit to the fuel pellet manufacturing unit.

In one embodiment, the method includes a step of adding a skeleton manufacturing unit configured for receiving separate skeleton parts and assembling the skeleton parts into skeleton 6.

In one embodiment, the method includes a step of adding a pre-plugged cladding tube manufacturing unit configured for the manufacturing of cladding tubes having one plug welded at one end of the cladding tube. Such a pre-plugged cladding tube may be used directly in the fuel rod loading station 80.

Each additional manufacturing unit may be located in the same building as an existing manufacturing unit or may be located in a new building that is connected to the building(s) of the existing the manufacturing unit(s).

In one embodiment, skeleton manufacturing unit and/or a pre-plugged cladding tube manufacturing unit is/are added to an existing nuclear fuel assembly manufacturing plant 20 comprising a fuel assembly manufacturing unit 22 and/or a fuel rod manufacturing unit 70, with each being located in the same building as the fuel assembly manufacturing unit 22 or in the same building as the fuel rod manufacturing unit 70.

For example, the added skeleton manufacturing unit and/or the added pre-plugged cladding tube manufacturing unit each can be located at a first floor of a fuel assembly manufacturing unit 22 and/or a fuel rod manufacturing unit 70.

In one specific example, an added skeleton manufacturing unit is located at a first floor of an existing fuel assembly manufacturing unit 22 and/or an added pre-plugged cladding tube manufacturing unit is located at a first floor of an existing fuel rod manufacturing unit 70.

Figure 13:
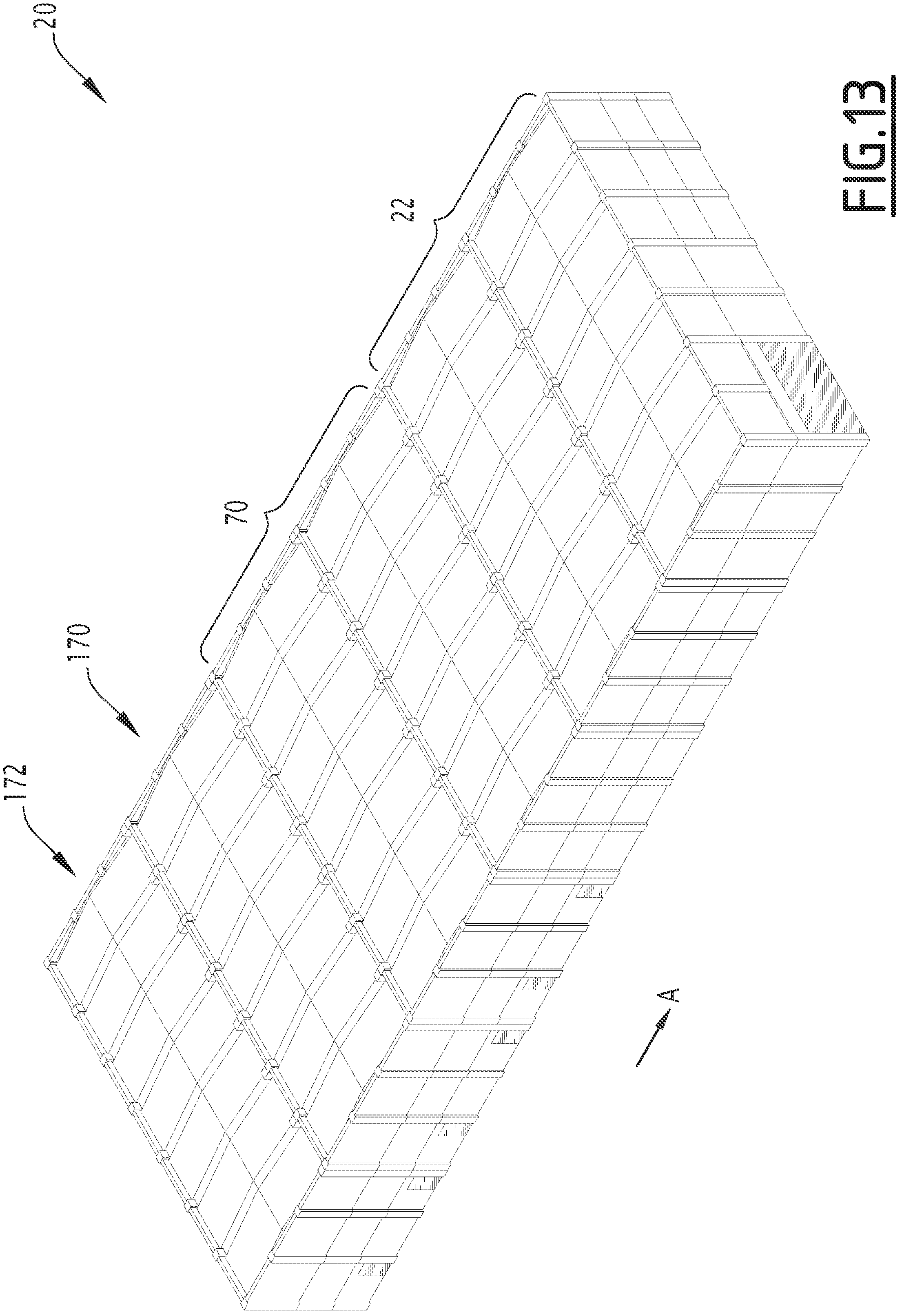
FIG. 13 is a perspective view of a nuclear fuel assembly manufacturing plant.

In a specific embodiment, as illustrated on FIG. 13, the method comprises sequentially building a fuel assembly manufacturing unit 22, then adding a fuel rod manufacturing unit 70 to the existing fuel assembly manufacturing unit 22, then, optionally, adding a fuel pellet manufacturing unit 170 and then, optionally, adding a fuel powder manufacturing unit 172. Each addition is performed after operation the existing manufacturing unit(s) for a while, typically several months or several years.

According to one aspect, the method comprises adding an additional manufacturing unit which is a manufacturing unit of the same type as an existing manufacturing unit of the plant, i.e. a manufacturing unit configured for performing the same manufacturing steps.

In one embodiment, the additional manufacturing unit is a fuel assembly manufacturing unit 22 added to an existing fuel assembly manufacturing unit 22 for increasing production capacity.

In one embodiment the method includes a step of building an additional fuel pellet manufacturing unit 170 configured for manufacturing $UO_2$ based nuclear fuel pellets and connecting the additional fuel pellet manufacturing unit 170 to the additional fuel rod manufacturing unit 70.

Optionally, the method includes a step of building an additional fuel powder manufacturing unit 172 configured for converting $UF_6$ into $UO_2$ and connecting the additional fuel powder manufacturing unit to the additional fuel pellet manufacturing unit 170.

The method of expanding a nuclear fuel assembly manufacturing plant 20 avoids investing immediately in a complete nuclear fuel assembly manufacturing plant 20 including the fuel rod manufacturing unit 70, and thus makes the starting investment easier. In addition, this allows gaining knowledge of the fuel assembly assembling before stepping to the fuel rod manufacturing starting from pellets which is more delicate.

Advantageously, complementary manufacturing units (fuel assembly manufacturing unit 22, fuel rod manufacturing unit 70, fuel pellet manufacturing unit 170 and fuel powder manufacturing unit 172) are aligned in an alignment direction A and manufacturing units of the same type (e.g. two fuel assembly manufacturing units 22) are placed side-by-side in the transverse direction T.

In addition, each pair of manufacturing units of the same type are preferably arranged symmetrically with respect to a vertical median plan S located between the two manufacturing units, in terms of location of their respective stations. The vertical median plan S extends vertically and along the alignment direction A.

Figure 14:
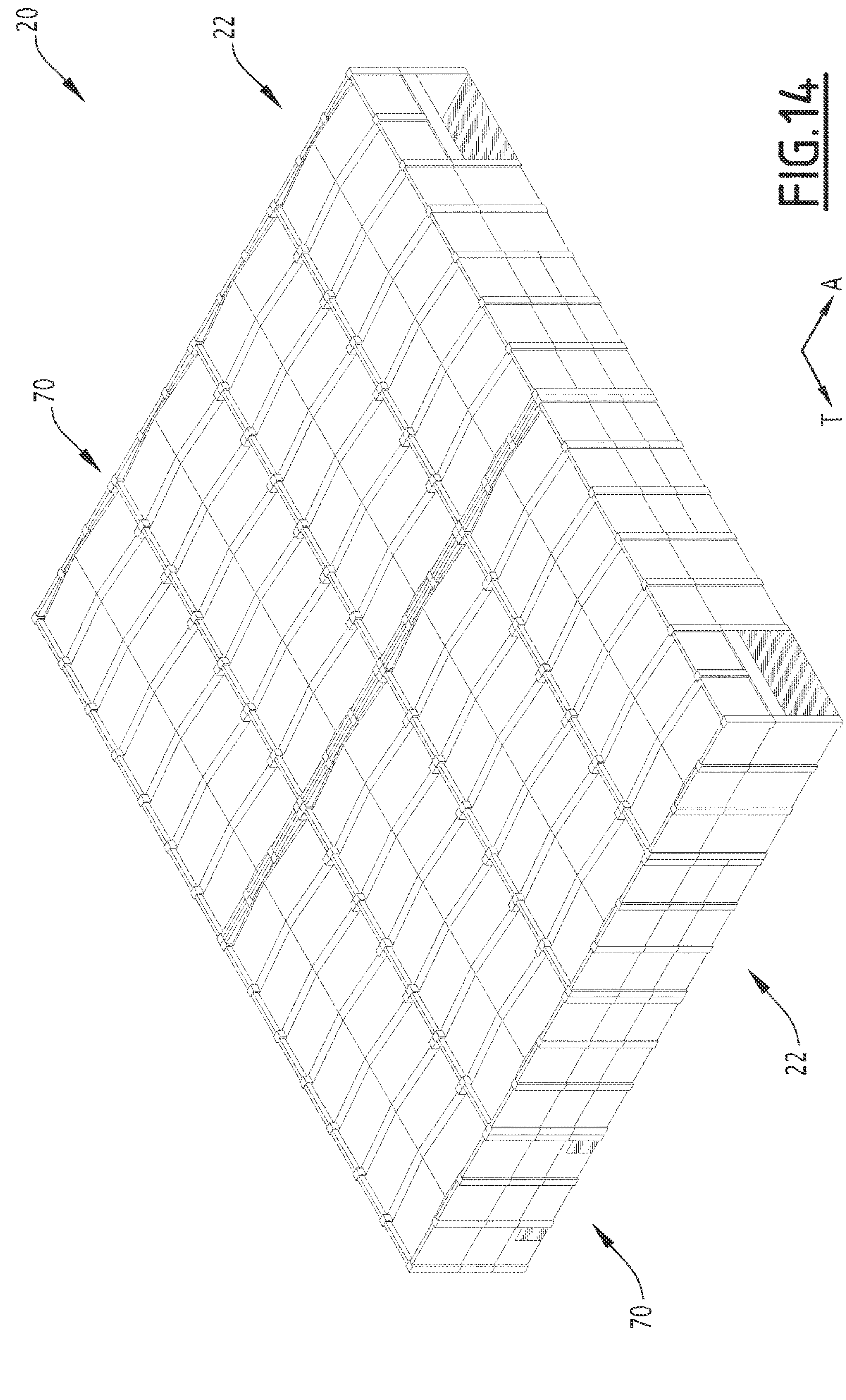
FIGS. 14 and 15 are respectively a perspective view and a top view of a nuclear fuel assembly manufacturing plant.
Figure 15:
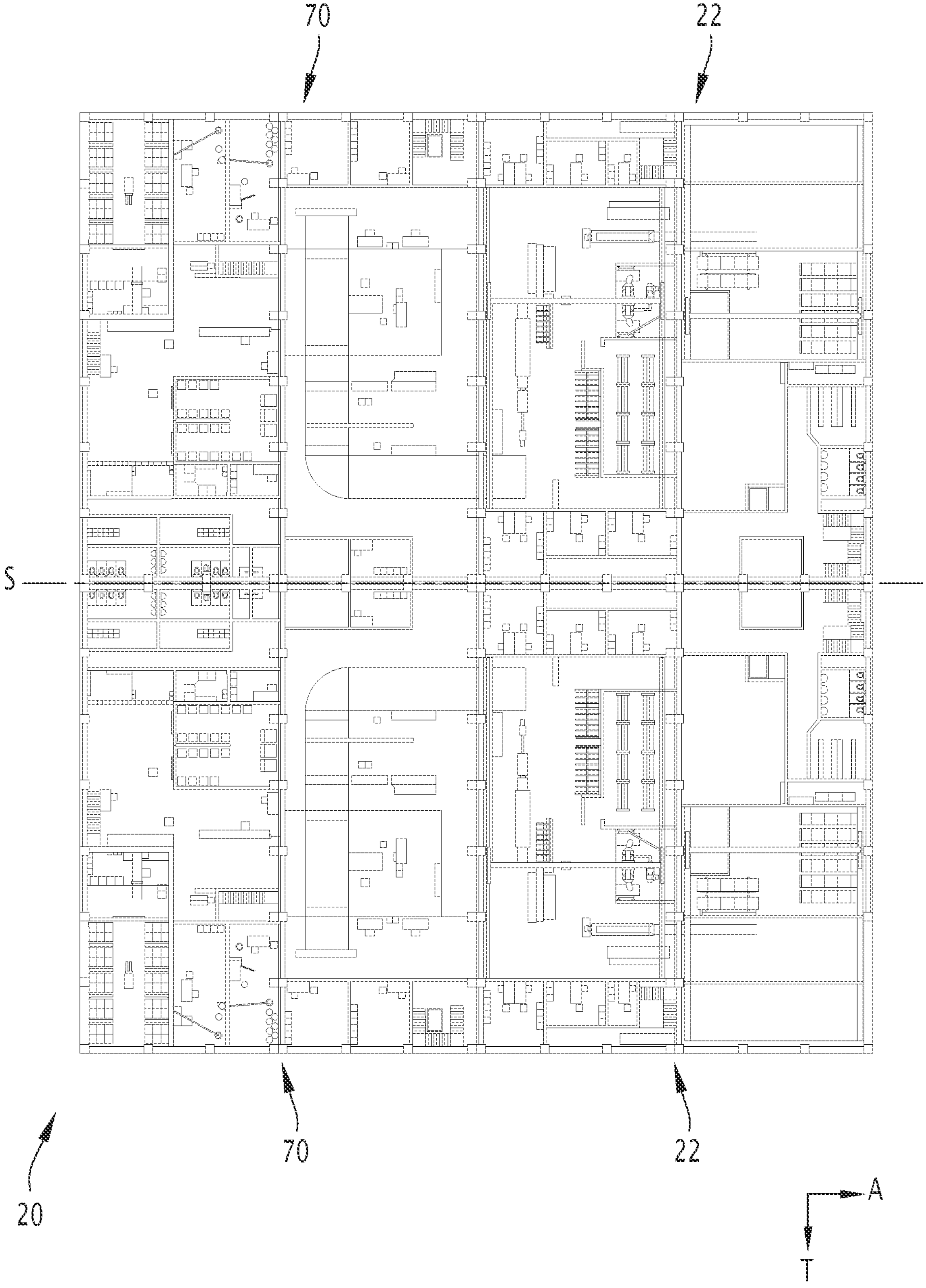

In the example illustrated on FIGS. 14 and 15, the nuclear fuel assembly manufacturing plant 20 comprises two fuel assembly manufacturing units 22 and two fuel rod manufacturing units 70. The two fuel assembly manufacturing units 22 are located side-by-side in the transverse direction T. Each fuel rod manufacturing unit 70 is aligned with a respective fuel assembly manufacturing unit 22 in the alignment direction A.

The manufacturing units are located in a 2×2 matrix pattern.

The two fuel assembly manufacturing units 22 are configured symmetrically with respect to a vertical median plan S, in terms of disposition of their respective stations. The two fuel rod manufacturing units 70 are configured symmetrically with respect to the vertical median plan S, in terms of disposition of their respective stations.

According to one aspect of the present disclosure, e.g. for allowing to implement the method of expanding the nuclear fuel assembly manufacturing plant 20, this latter is of modular construction.

The nuclear fuel assembly manufacturing plant 20 is for example configured for sequentially adding manufacturing units of different types for performing different steps of the manufacture of a fuel assembly 2 (fuel assembly manufacturing unit 22, fuel rod manufacturing unit 70 . . . ).

The nuclear fuel assembly manufacturing plant 20 is configured for connecting the manufacturing units of different types in the alignment direction A, whereby the nuclear fuel assembly manufacturing plant 20 can be expanded with adding complementary manufacturing units (fuel rod manufacturing unit 70, fuel pellet manufacturing unit 170 and fuel powder manufacturing unit 172) in the alignment direction A.

The nuclear fuel assembly manufacturing plant 20 illustrated on FIGS. 4 and 5 comprises a fuel assembly manufacturing unit 22 and a fuel rod manufacturing unit 70 and could be expanded by adding a fuel pellet manufacturing unit and optionally a fuel powder manufacturing unit.

Each manufacturing unit (fuel assembly manufacturing unit, fuel rod manufacturing unit . . . ) comprises utility systems each configured to provide a utility necessary for implementation of the method and the operation of the plant.

The utility systems of each manufacturing unit may include one or several among the following: an electric supply system, a computer network, a heating, ventilating and air conditioning system, a gaz supply system, a water supply network, a wastewater network, a compressed air supply system, a process ventilation system, an airborne contamination surveillance system, a criticality alarm system, a fire sections and doors system, a fire detector and alarm system.

Each manufacturing unit may comprise at least one utility system configured for interconnection with corresponding utility system of another manufacturing unit connected to said manufacturing unit and/or at least one utility system configured to operate independently from the corresponding utility system of another manufacturing unit connected to said manufacturing unit.

In one exemplary embodiment, at least one or each utility system of each manufacturing unit is natively configured for interconnection with a corresponding utility system of an upstream manufacturing unit that may potentially be constructed later side-by-side with the manufacturing unit.

Besides, each manufacturing unit is provided for interconnection with an additional manufacturing unit with delimiting a confined area.

Alternatively, at least one or each utility system of each manufacturing unit is independent from the corresponding utility system of each other manufacturing unit. This allows providing rightsized utility systems and thus limits the investment for the building of a manufacturing unit.

In a specific embodiment, each manufacturing unit comprises at least one utility system configured for interconnection with corresponding utility system of each other manufacturing unit and at least one utility configured to be independent from the corresponding utility system of each other manufacturing unit.

In such case, the utility system configured for interconnection is for example an alarm system, which is useful for propagating an alarm in all the manufacturing units or a computer network which is useful e.g. for transmission of information between manufacturing units, e.g. for traceability of the fuel assembly component during the manufacture of the fuel assembly.

In the example of FIGS. 4 and 5, the fuel assembly manufacturing unit 22 and the fuel rod manufacturing unit 70 are arranged side-by-side. The fuel assembly manufacturing unit 22 is configured for connecting a fuel rod manufacturing unit 70 on a side of the fuel assembly manufacturing unit 22.

The fuel assembly manufacturing unit 22 and the fuel rod manufacturing unit 70 each comprise utility systems When constructed alone, each utility system of the fuel assembly manufacturing unit 22 is natively configured for connection with a corresponding utility system of the fuel rod manufacturing unit 70 that may potentially be constructed later side-by-side with the fuel assembly manufacturing unit 22.

Besides, the fuel assembly manufacturing unit 22 is provided for interconnection with the fuel rod manufacturing unit 70 as regards the path of the fuel rods 4.

Indeed, as it is visible on FIG. 5, the final step of the nuclear fuel rod production is performed in the fuel rod inspection area 84 which is adjacent to the inserting station 24. The fuel rods 4 can thus be transferred from the fuel rod inspection area 84 to the inserting station 24 easily, here via the second conveying system 106.

Advantageously, the nuclear fuel assembly manufacturing plant 20 comprising a fuel assembly manufacturing unit 22 and a fuel rod manufacturing unit 70 is housed in a building made of several building modules, the fuel assembly manufacturing unit 22 and the fuel rod manufacturing unit 70 being housed in respective building module(s).

In other words, the fuel assembly manufacturing unit 22 is received in one or several building module(s) of the building which are distinct from the building module(s) receiving the fuel rod manufacturing unit 70.

In a more general manner, advantageously, a nuclear fuel assembly manufacturing plant comprising a first manufacturing unit and a second manufacturing different from one another and configured for performing two distinct steps is housed in a building made of building modules, the first manufacturing unit being housed in one or several building module(s) distinct from building module(s) receiving the second manufacturing unit.

This allows constructing the manufacturing units sequentially, e.g. with constructing and operating a first manufacturing unit before adding the second manufacturing unit to the fuel assembly manufacturing plant. The different aspects of the present disclosure are advantageous independently from each other. In addition, the specific features of the stations of the manufacturing unit are also advantageous independently from the manufacturing method and plant.

For example, the specific features of the pellet inspection area, the outgassing station, the fuel rod loading station, the welding station, the fuel rod inspection area, the fuel assembly cleaning station and/or the fuel assembly inspection station are advantageous in isolation or in combination. Hence the present disclosure relates in a general manner to a fuel assembly inspection station configured for inspection of the fuel assembly positioned in a vertical position and/or comprising an elevator for an operator.

Besides, the present disclosure also relates in a general manner to a fuel assembly cleaning station configured for inspection of the fuel assembly positioned in a vertical position and/or comprising an elevator for an operator and/or comprising a telescopic enclosure.

The present disclosure still relates in a general manner to a fuel rod conveying assembly comprising a fuel rod first conveying system extending in a first direction, a fuel rod second conveying extending in a second direction making a non-zero angle with the first direction, and a pivot trolley for transferring fuel rods from the first conveying system to the second conveying system.

What is claimed is:

1. A plant configured for manufacturing a nuclear fuel assembly comprising nuclear fuel rods arranged in a bundle and a skeleton supporting the fuel rods, the plant comprising:

a fuel assembly manufacturing unit comprising:
an inserting station configured for insertion of the fuel rods into the skeleton to obtain the fuel assembly; and
a packaging station configured for packaging the fuel assembly into a fuel assembly container for transportation; and
a fuel rod manufacturing unit side-by-side with the fuel assembly manufacturing unit such that fuel rods produced in the fuel rod manufacturing unit are transferred from a fuel rod inspection area of the fuel rod manufacturing unit to the inserting station of the fuel assembly manufacturing unit, the fuel rod manufacturing unit comprising:
at least one fuel rod inspection station configured for inspecting the fuel rods;
a welding station configured for welding plugs to ends of a cladding tube to form a fuel rod,
a first conveying system configured for conveying the fuel rods to the at least one fuel rod inspection station;
a second conveying system for conveying the fuel rods from a last inspection station of the at least one fuel rod inspection station to the inserting station, the first conveying system extending along a first direction and the second conveying system extending in a second direction making a non-zero angle with the first direction; and
a pivoting trolley configured for transferring the fuel rods from the first conveying system to the second conveying system with pivoting the fuel rods.

2. The plant according to claim 1, wherein the inserting station and the packaging station are located in a same building and/or in a same assembling hall, the plant further including a crane configured for moving the fuel assembly between the inserting station and the packaging station.

3. The plant according to claim 2, wherein the fuel assembly manufacturing unit comprises a cleaning station configured for cleaning of the fuel assembly and/or a fuel assembly inspection station configured for inspection of the fuel assembly.

4. The plant according to claim 3, wherein the cleaning station and/or the fuel assembly inspection station is/are configured for cleaning and/or inspecting the fuel assembly in a vertical position and/or substantially at ground level.

5. The plant according to claim 3, wherein the cleaning station and/or the fuel assembly inspection station comprise(s) a telescopic enclosure movable between a retracted position for loading the fuel assembly into the station and an extended position for enclosing the fuel assembly loaded into the station.

6. The plant according to claim 3, wherein the cleaning station and/or the fuel assembly inspection station comprise(s) at least one elevator for moving an operator vertically along the nuclear fuel assembly positioned vertically, e.g. for performing a visual inspection.

7. The plant according to claim 1 wherein the fuel rod manufacturing unit further comprises:
a pellet receiving area configured for receiving nuclear fuel pellets;
a pellet inspection area configured for inspection of the pellets;
an outgassing station comprising at least one outgassing furnace configured to expel potential hydrogenous contamination of the pellets;
a cladding station configured to receive cladding tubes and check the received cladding tubes; and/or
a fuel rod loading station configured for loading the pellets into the cladding tubes.

8. The plant according to claim 7, wherein the fuel rod manufacturing unit is connected to the fuel assembly manufacturing unit in a confined manner.

9. The plant according to claim 7, further comprising a conveying system including a transfer table for conveying the fuel rods from the fuel rod inspection area of the fuel rod manufacturing unit to the insertion station of the fuel assembly manufacturing unit.

10. The plant according to claim 7, wherein the pellet receiving area is configured for unpacking pellet transportation sheets from pellet containers and transferring the pellets from the pellet transportation sheets onto pellet trays and visually inspecting the nuclear pellets.

11. The plant according to claim 10, wherein the transferring of the pellets from the pellet transportation sheets onto the pellet trays includes:
placing the pellet tray side-by-side with the pellet transportation sheet such that furrows of the pellet transportation sheet are aligned with grooves of the pellet tray and sliding each pellet column of the pellet transportation sheet into a groove of the pellet tray; and/or
placing the pellet tray upside down on the pellet transportation sheet such that each pellet column is received in a respective groove of the pellet tray, and then turning the assembly composed of the pellet transportation sheet and the pellet tray upside down such that the pellet tray is below and the pellet transportation sheet above, and removing the pellet transportation sheet.

12. The plant according to claim 11, wherein each pellet transportation sheet is a metallic corrugated sheet comprising ridges alternating with the furrows and/or each pellet tray has parallel bars defining between them grooves configured for receiving pellets arranged in pellet columns.

13. The plant according to claim 10, wherein the plant is configured for transferring pellets from a pellet transportation sheet to a pellet tray and then turning the pellets upside-down between two pellet trays.

14. The plant according to claim 10, wherein the pellet trays are configured for stacking the pellet trays and/or storing the pellets and/or placing the pellets into an outgassing furnace and/or loading the pellets into the cladding tubes.

15. The plant according to claim 10, wherein the pellets remain on the pellet trays from the inspection to loading into the cladding tubes.

16. The plant according to claim 10, wherein the fuel rod manufacturing unit comprises movable pellet storage vaults, each storage vault being configured for storing the pellet trays and movable to allow transferring the pellet trays.

17. The plant according to claim 1, wherein the plant is housed in a building made of a plurality of building modules, the fuel assembly manufacturing unit being housed in a first building module of the plurality of building modules and the fuel rod manufacturing unit being housed in a further building module of the plurality of building modules.

18. The plant according to claim 1, further comprising a logistic area configured for shipping the fuel assemblies manufactured in the plant, for receiving skeleton parts to be assembled to obtain the skeletons and/or for receiving the fuel rods.

19. The plant according to claim 1, wherein the fuel assembly manufacturing unit comprises at least one utility system, the plant further comprising a further fuel assembly manufacturing unit connected with the fuel assembly manufacturing unit, the further fuel assembly manufacturing unit including a further utility system, the at least one utility system configured for interconnection with the further utility system.

20. The plant according to claim 1, wherein the fuel assembly manufacturing unit comprises at least one utility system, the plant further comprising a further fuel assembly manufacturing unit connected with the fuel assembly manufacturing unit, the further fuel assembly manufacturing unit including a further utility system, the at least one utility system configured to operate independently from the further utility system.

* * * * *